United States Patent [19]
Kurotsu

[11] Patent Number: 5,910,762
[45] Date of Patent: Jun. 8, 1999

[54] MULTIPLE-BIT COMPARATOR WITH RELIABLE OUTPUT TIMING AND REDUCED HAZARDS

[75] Inventor: Satoru Kurotsu, Tokyo, Japan

[73] Assignee: Oki Electric Industry Co., Ltd., Tokyo, Japan

[21] Appl. No.: 08/822,340

[22] Filed: Mar. 20, 1997

[30] Foreign Application Priority Data

Apr. 24, 1996 [JP] Japan .................................. 8-102129

[51] Int. Cl.$^6$ ........................................................ G06F 7/02
[52] U.S. Cl. ............................................................ 340/146.2
[58] Field of Search ........................................... 340/146.2

[56] References Cited

U.S. PATENT DOCUMENTS

| 5,281,946 | 1/1994 | Van Le | 340/146.2 |
| 5,319,348 | 6/1994 | Lee et al. | 340/146.2 |
| 5,534,844 | 7/1996 | Norris | 340/146.2 |

FOREIGN PATENT DOCUMENTS

| 0386 831 | 3/1990 | European Pat. Off. . |
| 61-252706 | 11/1986 | Japan . |
| 6-75748 | 3/1994 | Japan . |

OTHER PUBLICATIONS

CMOS Kairo no Tsukaikata (I) [Using CMOS Circuits (I)], Kogyo Chosakai, Jan. 20, 1988, pp. 108–109.
"Dynamic Comparator With Data Selftiming", 700 IBM Technical Disclosure Bulletin 38 (1995) No. 5, Armonk NY, USA; vol. 38, No. 05 May 1995, pp. 181–182.
"Comparison Circuit", IBM Technical Disclosure Bulletin (1980); vol. 23, No. 5; Oct. 1980; pp. 2032–2033.

Primary Examiner—Margaret R. Wambach
Attorney, Agent, or Firm—Rabin & Champagne P.C.

[57] ABSTRACT

A multiple-bit comparator compares the individual bits of a first multiple-bit signal with the corresponding bits of a second multiple-bit signal. An output control circuit in the multiple-bit comparator detects, from transitions in the second signal, whether the second signal is valid or invalid, and holds an output signal at a fixed logic level when the second signal is invalid. When the second signal is valid, the output signal is controlled according to the combined results of the individual bit comparisons. The individual bit comparison results are preferably combined by wired-OR logic.

29 Claims, 17 Drawing Sheets

MULTIPLE-BIT COMPARATOR WITH RELIABLE OUTPUT TIMING AND REDUCED HAZARDS

BACKGROUND OF THE INVENTION

The present invention relates to a method of comparing multiple-bit input signals, and a multiple-bit comparator that can be used in, for example, a content-addressable memory such as a cache memory.

A multiple-bit comparator receives a pair of multiple-bit input signals, and generates an output signal that indicates whether the two input signals are mutually identical in every bit. In a cache memory, one of the input signals gives the address of a desired data word, and the other input signal gives the address of a cached data word. The output signal indicates whether the two addresses are the same, resulting in what is termed a cache hit, or whether they are not the same, resulting what is termed in a cache miss.

The classic circuit configuration of a multiple-bit comparator, which will be illustrated later, comprises a plurality of exclusive OR gates that compare the individual bits of the two input signals, and a NOR gate that combines the outputs of the exclusive OR gates to generate the final output signal. This configuration works well only when the number of input bits is small. When there are many bits, it becomes difficult to design the NOR gate without encountering such problems as excessive gate propagation delay, excessive circuit layout space, and excessive power dissipation.

To avoid these problems, Japanese Patent Kokai Application No. 252706/1986 discloses a multiple-bit comparator in which the exclusive OR gates have an open-drain output structure, and are coupled in a wired-OR configuration to a sense amplifier. Japanese Patent Kokai Application No. 75748/1994 discloses a multiple-bit comparator in which the exclusive OR gates drive respective pull-up transistors, which are coupled in a wired-OR configuration to an output terminal that is pre-charged to the ground level. The output signals of both of these multiple-bit comparators are normally in the state denoting mutually identical input signals. When the input signals are not identical, the output timing therefore varies depending on the number of non-matching bits, creating problems in timing design.

A further problem, not addressed by any of the above prior art, is that of false output signals, referred to as hazards, that may occur when one or both of the input signals are invalid. In a cache memory, such hazards can cause memory control circuits to malfunction, or cause the wrong data to be accessed. Such hazards also create timing design difficulties, because it becomes necessary to ensure that the output signal is sampled at a point that avoids the hazards, as far as possible.

SUMMARY OF THE INVENTION

It is accordingly an object of the present invention to simplify the timing design of a multiple-bit comparator.

Another object of the invention is to eliminate hazards from the output of a multiple-bit comparator.

Still another object is to improve the operating speed of a multiple-bit comparator.

A further object is to reduce the size of a multiple-bit comparator.

A still further object is to reduce the power dissipation of a multiple-bit comparator.

The invented method of comparing a first multiple-bit input signal with a second multiple-bit input signal comprises the steps of:

comparing the individual bits of the first input signal with the corresponding bits of the second input signal;

detecting, from transitions in the second input signal, whether the second input signal is valid or invalid;

holding an output signal at a fixed logic level, preferably a logic level indicating that the input signals are not mutually identical, when the second input signal is invalid; and controlling the output signal according to the combined results of the individual bit comparisons when the second input signal becomes valid.

The invented multiple-bit comparator receives a first multiple-bit input signal and a pair of second multiple-bit input signals. The second input signals have a valid state, in which corresponding bits have complementary logic levels, and an invalid state, in which corresponding bits are at the same logic level.

A plurality of single-bit comparators compare the individual bits of the first input signal with individual pairs of bits of the second input signals. The results of these comparisons are supplied to a first node.

An output control circuit compares one pair of bits in the pair of second input signals, and supplies a ready signal, indicating when the second input signals are valid, to a second node.

An output circuit performs a logic operation on the logic levels of the first node and second node to generate an output signal. The logic level of the output signal is held fixed while the second input signals are invalid, and varies depending on the logic level of the first node when the second input signals are valid.

By feeding all single-bit comparison results to a common first node, the invented multiple-bit comparator reduces circuit size and power dissipation, and enables high-speed operation.

By holding the output signal at a fixed logic level when the second input signals are invalid, the invention reduces hazards in the output signal. If this logic level is the level indicating that the input signals are not mutually identical, the output timing becomes independent of the number of non-matching bits. To further reduce hazards, and to simplify timing design, the invented multiple-bit comparator may have a dummy load coupled to the second node.

DETAILED DESCRIPTION OF THE INVENTION

Figure 1:
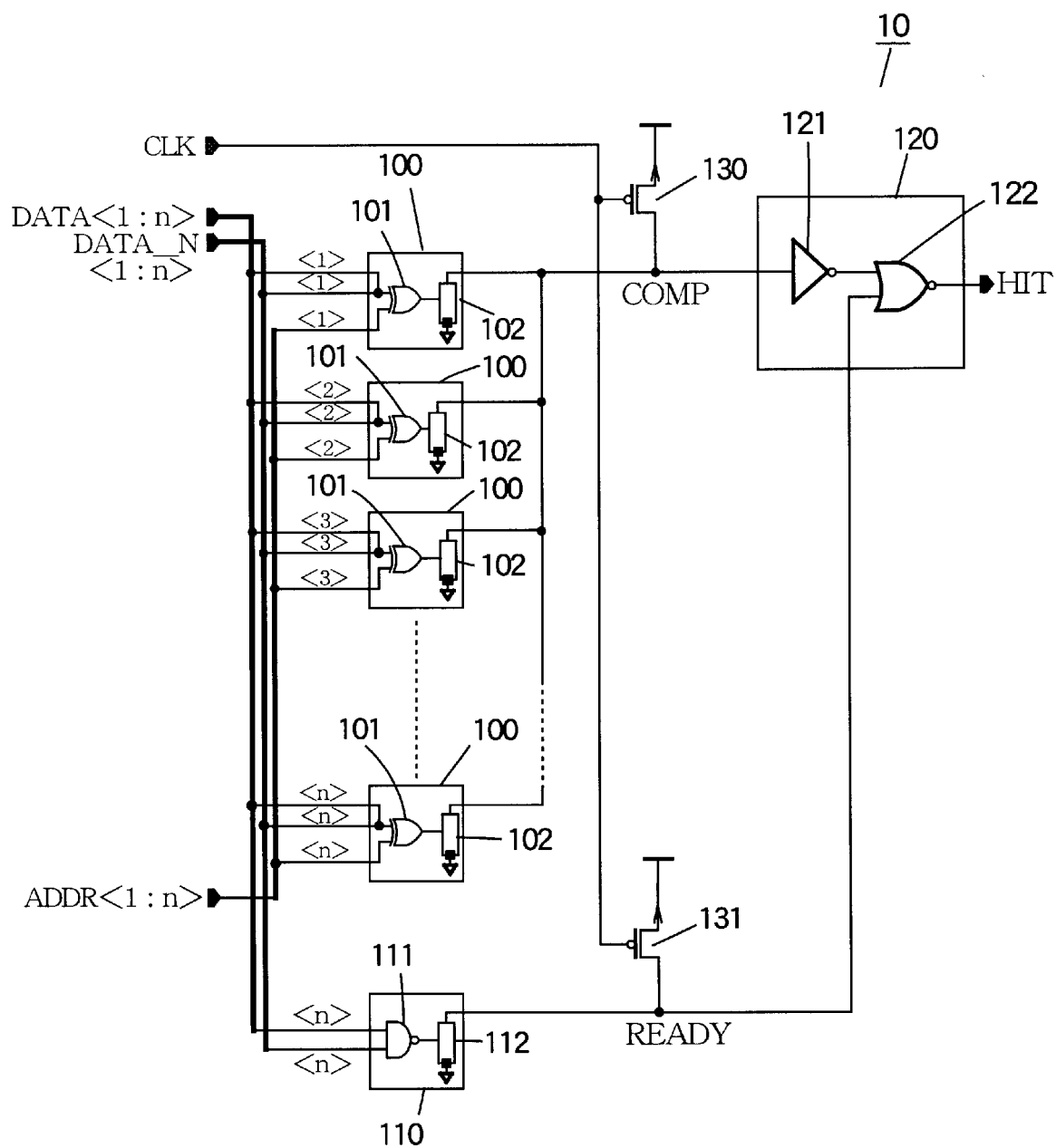
FIG. 1 is a schematic diagram of a multiple-bit comparator according to a first embodiment of the invention.

Embodiments of the invention will be described with reference to the attached illustrative drawings. These embodiments will be described in the context of a cache memory in a semiconductor integrated circuit, although none of the embodiments are limited to this particular use.

In the drawings, the input signals to be compared will be denoted ADDR<1:n> and DATA<1:n>. The notation <1:n> indicates that each signal comprises n bits, which are input in parallel, n being an arbitrary integer greater than one. Individual bits will be identified by symbols from <1> to <n>. DATA<1:n> is received in complementary form, the complementary inputs being denoted DATA_N<1:n>.

The input signals DATA<1:n>, DATA_N<1:n>, and ADDR<1:n> are synchronized with a clock signal, denoted CLK. The clock signal alternates between a high level equal to a positive power-supply potential, and a low level equal to a zero potential or ground potential. These high and low levels are also the logic levels of the input signals DATA<1:n>, DATA_N<1:n>, and ADDR<1:n>. The power-supply potential will be denoted by a short horizontal line in the drawings, and the ground potential by a small triangle.

Constituent elements of the embodiments will be denoted by three-digit reference numerals. Corresponding elements in different embodiments will be distinguished by the first of the three digits, the other two digits being the same. The corresponding elements may be identical, or merely analogous. In the identical case, repeated descriptions will be omitted.

Referring to FIG. 1, the first embodiment is an n-bit comparator 10 comprising n single-bit comparators 100, an output control circuit 110, an output circuit 120, and a pair of p-channel metal-oxide-semiconductor field-effect transistors (hereinafter, PMOS transistors) 130 and 131.

Each single-bit comparator 100 receives one bit of each of the input signals DATA<1:n>, DATA_N<1:n>, and ADDR<1:n>. The detailed internal structure of the single-bit comparators 100 will be described later. The outputs of the single-bit comparators 100 are coupled in a wired-OR configuration to a node, denoted COMP, which is coupled to the drain electrode of PMOS transistor 130.

The output control circuit 110 receives one bit of each of the pair of input signals DATA<1:n> and DATA_N<1:n>. Any bit may be used, e.g. DATA<n> and DATA_N<n>, as shown in the drawings. The detailed internal structure of the output control circuit 110 will be described later. The output of the output control circuit 110 is supplied to a node, denoted READY, which is coupled to the drain electrode of PMOS transistor 131.

PMOS transistors 130 and 131 function as pre-charging elements. Their source electrodes receive the power-supply potential, and their gate electrodes receive the clock signal CLK.

The output circuit 120 receives inputs from the COMP and READY nodes, and produces an output signal denoted HIT. The internal structure of the output circuit 120 will be described later.

Figure 2:
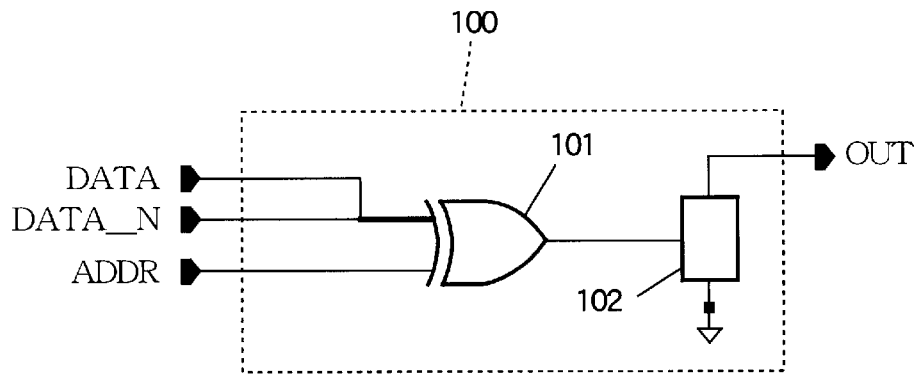
FIG. 2 illustrates the logical structure of a single-bit comparator in the first embodiment.
Figure 3:
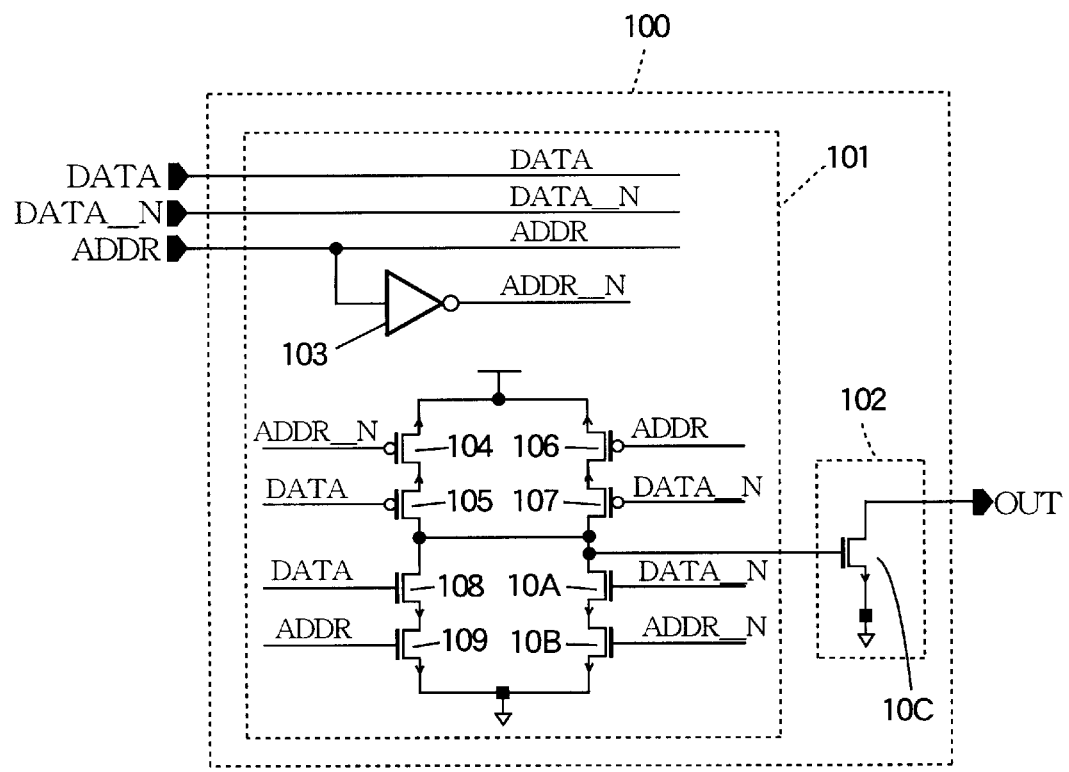
FIG. 3 illustrates the circuit configuration of a single-bit comparator in the first embodiment.

FIGS. 2 and 3 show the logical structure and circuit configuration of one of the n single-bit comparators 100. All of the single-bit comparators 100 have this structure and configuration.

Referring to FIG. 2, a single-bit comparator 100 has three input terminals, denoted DATA, DATA_N, and ADDR, each of which receives one bit of the corresponding n-bit input signal. The received bits will be referred to as DATA, DATA_N, and ADDR below. The three input terminals are coupled to a two-input exclusive OR gate 101, which takes the exclusive logical OR of the DATA and ADDR bits. The output of the exclusive OR gate 101 drives a discharging element 102, which is coupled to a ground terminal and to an output terminal denoted OUT.

Referring to FIG. 3, the exclusive OR gate 101 has an inverter 103, which is coupled to the ADDR input terminal and generates a complementary signal denoted ADDR_N. This signal ADDR_N is supplied to the gate electrode of a PMOS transistor 104 and an n-channel metal-oxide-semiconductor field-effect transistor (hereinafter, NMOS transistor) 10B. The DATA signal is supplied to the gate electrodes of a PMOS transistor 105 and an NMOS transistor 108. ADDR is supplied to the gate electrodes of a PMOS transistor 106 and an NMOS transistor 109. DATA_N is supplied to the gate electrodes of a PMOS transistor 107 and an NMOS transistor 10A.

The source electrodes of PMOS transistors 104 and 106 receive the power-supply potential, and their drain electrodes are coupled to the source electrodes of PMOS transistors 105 and 107, respectively. The source electrodes of NMOS transistors 109 and 10B receive the ground potential, and their drain electrodes are coupled to the source electrodes of NMOS transistors 108 and 10A, respectively. The drain electrodes of PMOS transistors 105 and 107 and NMOS transistors 108 and 10A are coupled in common to the gate electrode of an NMOS transistor 10C, which constitutes the discharging element 102. The source electrode of NMOS transistor 10C receives the ground potential, and its drain electrode is coupled to the output terminal OUT.

Each single-bit comparator 100 thus has an NMOS opendrain output structure. More specifically, each single-bit comparator 100 outputs a single-bit result signal that is either pulled down to the low (ground) level or left in the high-impedance state, depending on the logic levels of ADDR, DATA, and DATA_N. These single-bit result signals merge into a combined result signal at the COMP node. The combined result signal is pulled down to the low level when any one of the single-bit result signals is pulled down to the low level.

Figure 4:
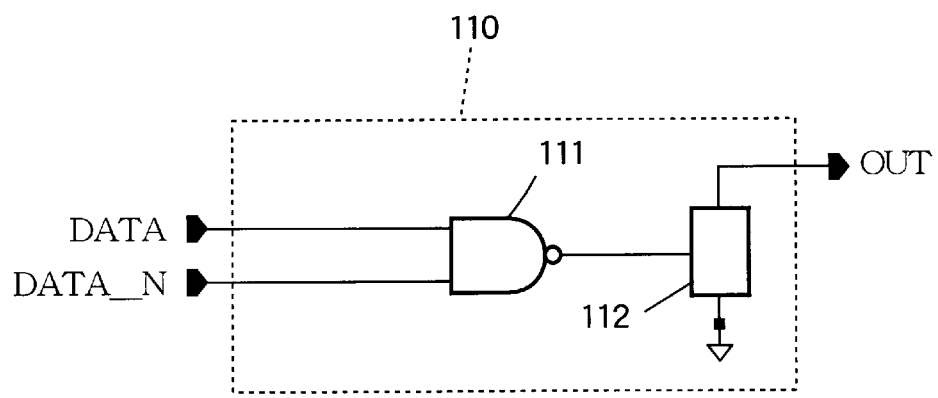
FIG. 4 illustrates the logical structure of the output control unit in the first embodiment.

Referring to FIG. 4, the output control circuit 110 has two input terminals, denoted DATA and DATA_N, that receive, for example, DATA<n> and DATA_N<n>. These input terminals are coupled to a two-input NAND gate 111, the output of which controls a discharging element 112. The discharging element 112 is coupled to a ground terminal and to another output terminal denoted OUT, distinct from the output terminals (also denoted OUT) of the single-bit comparators 100.

Figure 5:
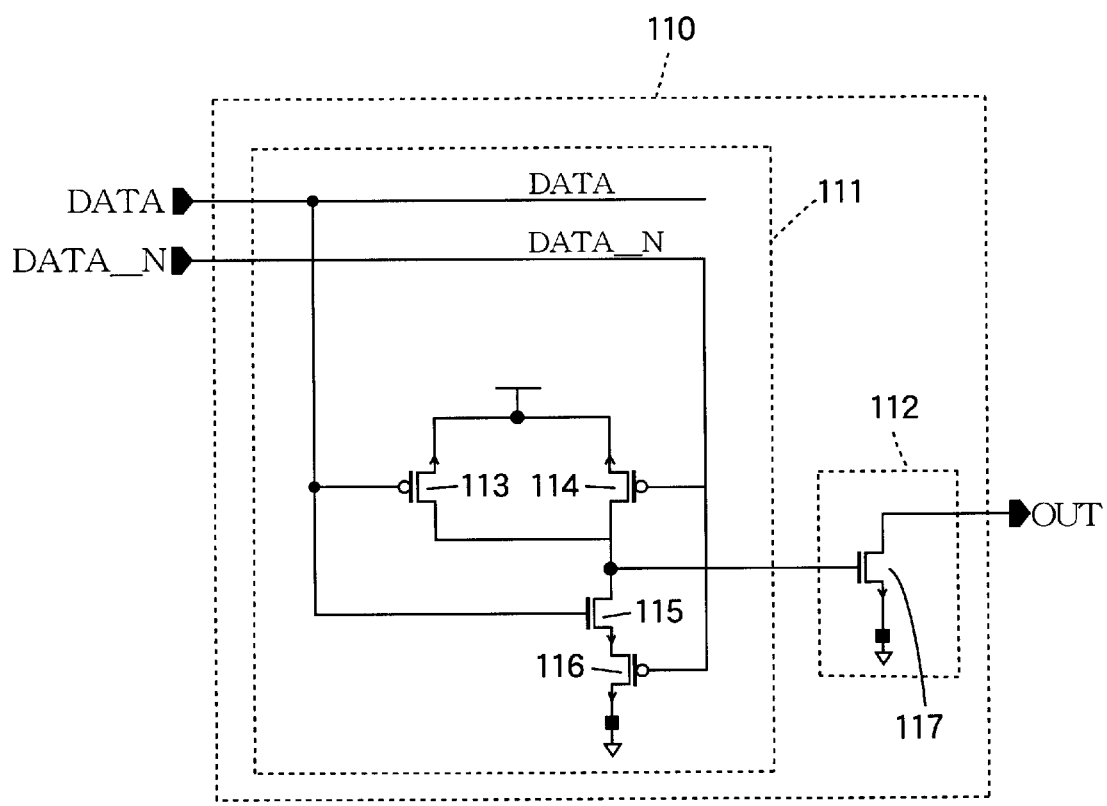
FIG. 5 illustrates the circuit configuration of the output control unit in the first embodiment.

Referring to FIG. 5, the NAND gate 111 comprises PMOS transistors 113 and 114 and NMOS transistors 115 and 116. The DATA input terminal is coupled to the gate electrodes of PMOS transistor 113 and NMOS transistor 115. The DATA_N input terminal is coupled to the gate electrodes of PMOS transistor 114 and NMOS transistor 116. The source electrodes of PMOS transistors 113 and 114 receive the power-supply potential. The source electrode of NMOS transistor 116 receives the ground potential, and its drain electrode is coupled to the source electrode of NMOS transistor 115. The drain electrodes of PMOS transistors 113 and 114 and NMOS transistor 115 are coupled to the gate electrode of an NMOS transistor 117, which constitutes the discharging element 112. The source electrode of NMOS transistor 117 receives the ground potential, and its drain electrode is coupled to the output terminal OUT.

The output control circuit 110 thus also has an NMOS open-drain output structure. More specifically, the output control circuit 110 outputs a ready signal that is either pulled down to the low level or left in the high-impedance state, depending on the logic levels of DATA and DATA_N.

Referring again to FIG. 1, the output circuit 120 comprises an inverter 121 and a two-input NOR gate 122. The inverter 121 inverts the logic level of the COMP node, and supplies the inverted logic level to the NOR gate 122. The other input to the NOR gate 122 is taken from the READY node. The output of to the NOR gate 122 is the output signal HIT.

Figure 6:
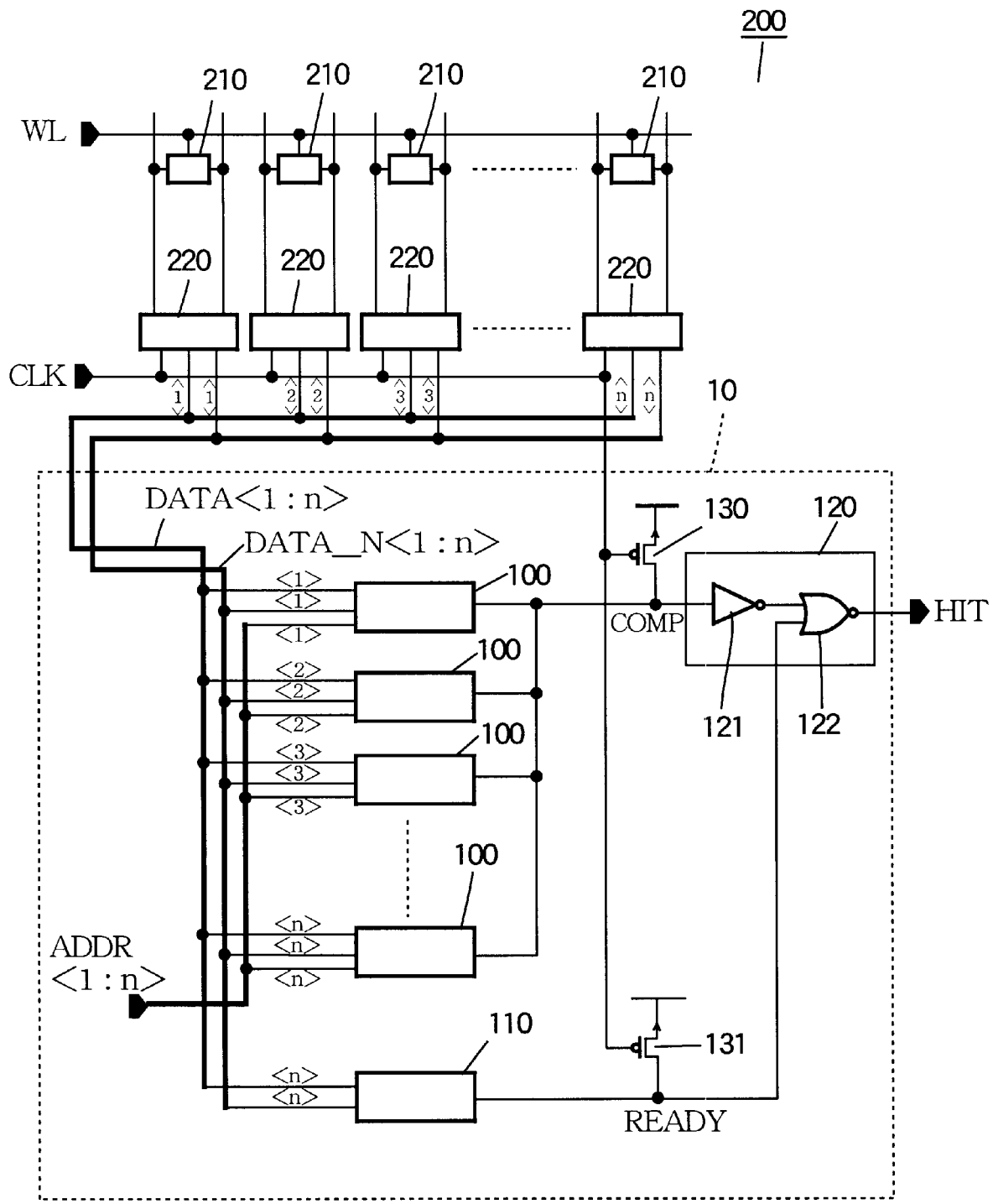
FIG. 6 is a schematic diagram of the first embodiment when used in a cache memory.

FIG. 6 shows how the n-bit comparator 10 can be coupled to the tag control section of a cache memory. The tag control section has a number of rows of memory cells which store address information identifying data present in the cache. FIG. 6 shows only one row of memory cells 210, collectively storing one address. Each row of memory cells is controlled by a word line (WL). The outputs of the memory cells are amplified by a row of sense amplifiers 220, which are controlled by the clock signal CLK. Each sense amplifier 220 amplifies one address bit. The sense amplifiers 220 generate the signals DATA<1:n> and DATA_N<1:n> supplied to the n-bit comparator 10. DATA<1:n> and DATA_N<1:n> accordingly represent address data.

Next the operation of the first embodiment will be described with reference to the foregoing drawings and to the timing diagrams in FIGS. 7 and 8.

When CLK is low, the outputs of the sense amplifiers 220 in FIG. 6 are disabled and the DATA<1:n> and DATA_N<1:n> signals are invalid. In the invalid state, all bits of both DATA<1:n> and DATA_N<1:n> are pulled up to the high level by pull-up elements internal to the sense amplifiers 220, as indicated by the waveforms in FIGS. 7 and 8.

In FIG. 3, either the path through NMOS transistors 108 and 109 or the path through NMOS transistors 10A and 10B is in the conducting state, depending on whether ADDR or ADDR_N is at the high level, while PMOS transistors 105 and 107 are both turned off. The gate electrode of NMOS transistor 10C is therefore at the ground level, and NMOS transistor 10C is turned off. Consequently, the output terminals of all of the single-bit comparators 100 are disconnected from the ground potential, and their single-bit result signals are in the high-impedance state.

In FIG. 5, DATA and DATA_N are both high, so PMOS transistors 113 and 114 are both in the off-state, NMOS transistors 115 and 116 are both turned on, the gate electrode of NMOS transistor 117 is at the ground level, and NMOS transistor 117 is turned off. The output terminal of the output control circuit 110 is also disconnected from the ground potential, and the ready signal is also in the high-impedance state.

Figure 7:
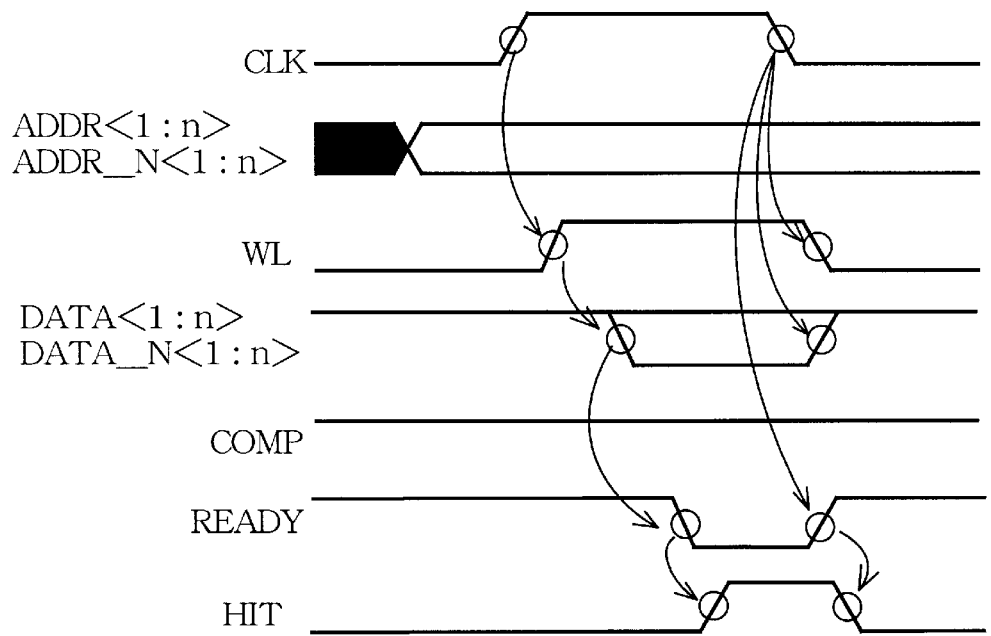
FIG. 7 shows waveforms when a cache hit occurs.
Figure 8:
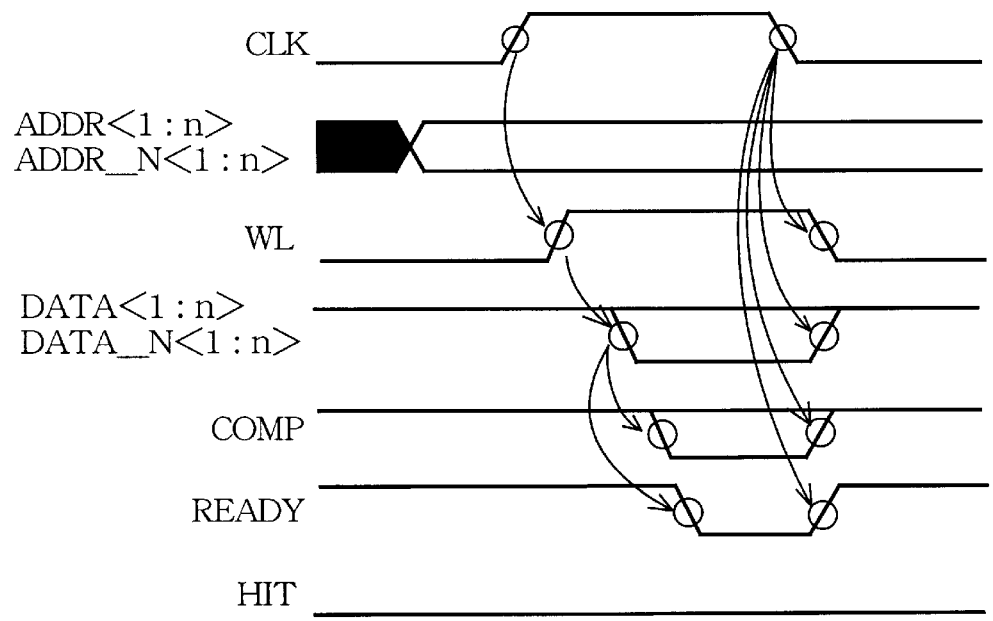
FIG. 8 shows waveforms when a cache miss occurs.

During the interval while CLK is low, PMOS transistors 130 and 131 are turned on, so the COMP and READY nodes are pre-charged to the high logic level, i.e., to the positive power-supply potential, as indicated in FIGS. 7 and 8. Since the NOR gate 122 receives a high input from the READY node, the HIT output signal is low, as also indicated in FIGS. 7 and 8.

The pre-charging of the COMP and READY nodes, incidentally, entails the pre-charging of the parasitic capacitance of the signal lines connected to these nodes, and the pre-charging of the parasitic capacitance of pn junctions in the single-bit comparators 100 and output control circuit 110, as well as the charging of the input capacitances of the inverter 121 and NOR gate 122.

At a certain point in the interval while CLK is low, the ADDR<1:n> input signal becomes valid, as indicated by the change from black to white in FIGS. 7 and 8. The ADDR<1:n> input signal now represents an address to be compared with the address held in the row of memory cells 210 in FIG. 6.

When CLK goes high, PMOS transistors 130 and 131 turn off, disconnecting the COMP and READY nodes from the power-supply potential. Following the rise of CLK, the word line WL in FIG. 6 is driven to the high level, as shown in FIGS. 7 and 8, and the sense amplifiers 220 are enabled. After a certain delay from the rise of WL, the DATA<1:n> and DATA_N<1:n> signals become valid, taking on mutually complementary values.

The subsequent operation differs depending on whether ADDR<1:n> matches DATA<1:n>, indicating a cache hit, or does not match DATA<1:n>, indicating a cache miss.

FIG. 7 illustrates a cache hit. Since every bit of ADDR<1:n> matches every bit of DATA<1:n>, in every single-bit comparator 100, the paths through PMOS transistors 104, 105, 106, and 107 in FIG. 3 are both in the non-conducting state, while either the path through NMOS transistors 108 and 109 or the path through NMOS transistors 10A or 10B is in the conducting state. The gate potential of NMOS transistor 10C therefore remains low, NMOS transistor 10C remains turned off, all of the single-bit result signals remain in the high-impedance state, and the COMP node remains charged at the high logic level.

When the DATA<1:n> and DATA_N<1:n> signals become valid, the NAND 111 gate in FIG. 5 receives complementary inputs. Since one input is low, the output of the NAND gate 111 goes high, turning on NMOS transistor 117, pulling down the ready signal, and forcing the READY node to discharge to ground.

The NOR gate 122 now receives two low inputs: the high level of the COMP node inverted by inverter 121, and the low level of the READY node. The HIT signal output by the NOR gate 122 accordingly goes high, as shown in FIG. 7, indicating a cache hit.

When the CLK signal goes low again, the word line WL also goes low, DATA<1:n> and DATA_N<1:n> both revert to the invalid state in which all bits are high, the COMP and READY nodes are pre-charged to the high level again, and the HIT output signal goes low.

FIG. 8 illustrates a cache miss. In this case, at least one bit of ADDR<1:n> fails to match the corresponding bit of DATA<1:n>. In the corresponding single-bit comparator 100, the paths through NMOS transistors 108, 109, 10A, and 10B in FIG. 3 are both in the non-conducting state, and either the path through PMOS transistors 104 and 105 or the path through PMOS transistors 106 and 107 is in the conducting state, so the gate electrode of NMOS transistor 10C is brought to the high level and NMOS transistor 10C turns on, pulling down the corresponding single-bit result signal and forcing the COMP node to discharge to ground, as indicated in FIG. 8.

The READY node also discharges to ground through the output control circuit 110, as it did in the case of a cache hit. The NOR gate 122, however, continues to receive one high input, the high input now coming from the inverter 121, which inverts the low level of the COMP node, so the HIT output signal remains at the low level.

In both the cache hit and cache miss cases, the READY node does not go low until the input signals DATA<1:n> and DATA_N<1:n> become valid, at which time ADDR<1:n> is already valid. The HIT output signal is therefore held in the low state until all input signals have become valid, regardless of the length of the delay from the rise of the clock signal CLK to the falling transitions that mark the validity of DATA<1:n> and DATA_N<1:n>. The n-bit comparator 10 cannot output a false cache hit signal due to an accidental coincidence between DATA<1:n> and ADDR<1:n> during the period while any of the input signals are invalid.

Furthermore, the validity of the input signals DATA<1:n> and DATA_N<1:n> is detected from transitions in DATA<1:n> and DATA_N<1:n> themselves, by the output control circuit 110. Timing design is thereby simplified, because no extra precautions have to be taken to ensure that READY does not go low before the input signals are valid.

Timing design is also simplified in the circuits that use the HIT output signal, because the rise of the HIT output signal in a cache hit always occurs at the same time, as reliably determined by the fall of the ready signal. The timing of the HIT output signal does not depend on the number of mis-matching bits in a cache miss, because the HIT output signal remains constant in a cache miss.

Like the classic multiple-bit comparator that will be illustrated later, the n-bit comparator 10 of the first embodiment uses a NOR gate to produce the final output signal, but this NOR gate 122 has only two inputs. The problems of excessive gate propagation delay, excessive circuit layout space, and excessive power dissipation encountered in the classic n-bit comparator are therefore avoided; regardless of the value of n, the output circuit 120 has the same small size and low power dissipation as in the n=2 case. Because of the small propagation delay, the n-bit comparator 10 of the first embodiment can operate at high speed.

Next, a second embodiment will be described.

Figure 9:
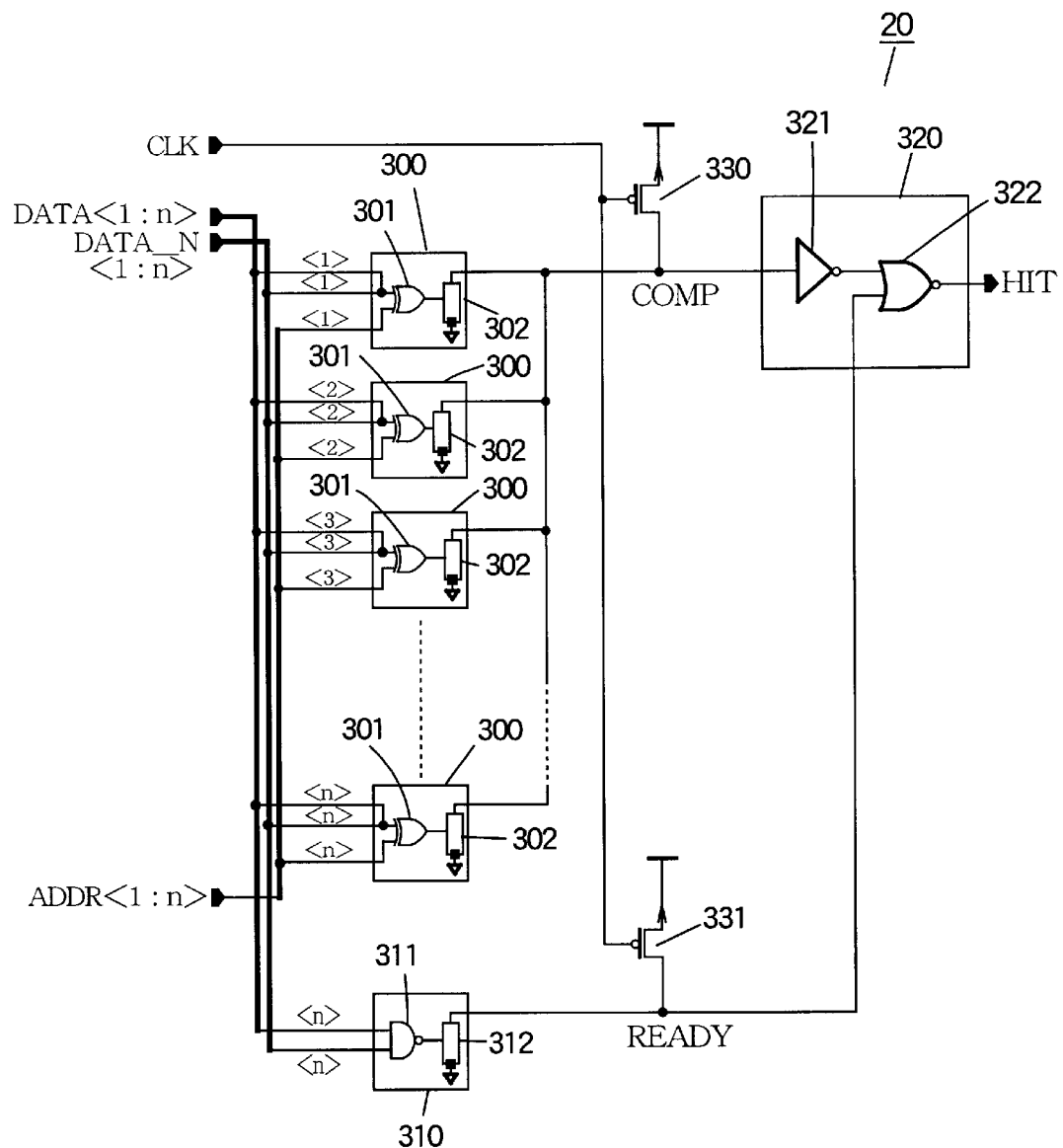
FIG. 9 is a schematic diagram of a multiple-bit comparator according to a second embodiment of the invention.

Referring to FIG. 9, the second embodiment is an n-bit comparator 20 comprising n single-bit comparators 300, an output control circuit 310, an output circuit 320, and PMOS transistors 330 and 331. The structure of this n-bit comparator 20 is identical to the structure of the n-bit comparator 10 of the first embodiment, except for the internal structure of the single-bit comparators 300 and output control circuit 310.

Figure 10:
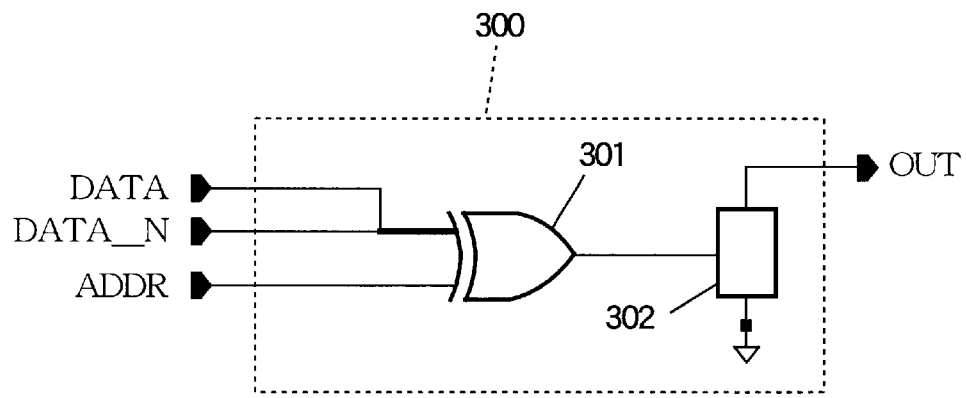
FIG. 10 illustrates the logical structure of a single-bit comparator in the second embodiment.

Referring to FIG. 10, the single-bit comparators 300 have the same logical structure as in the first embodiment, comprising an exclusive OR gate 301 and a discharging element 302. The exclusive OR gate 301 is identical to the exclusive OR gate 101 in the first embodiment, having the circuit configuration shown in FIG. 3.

Figure 11:
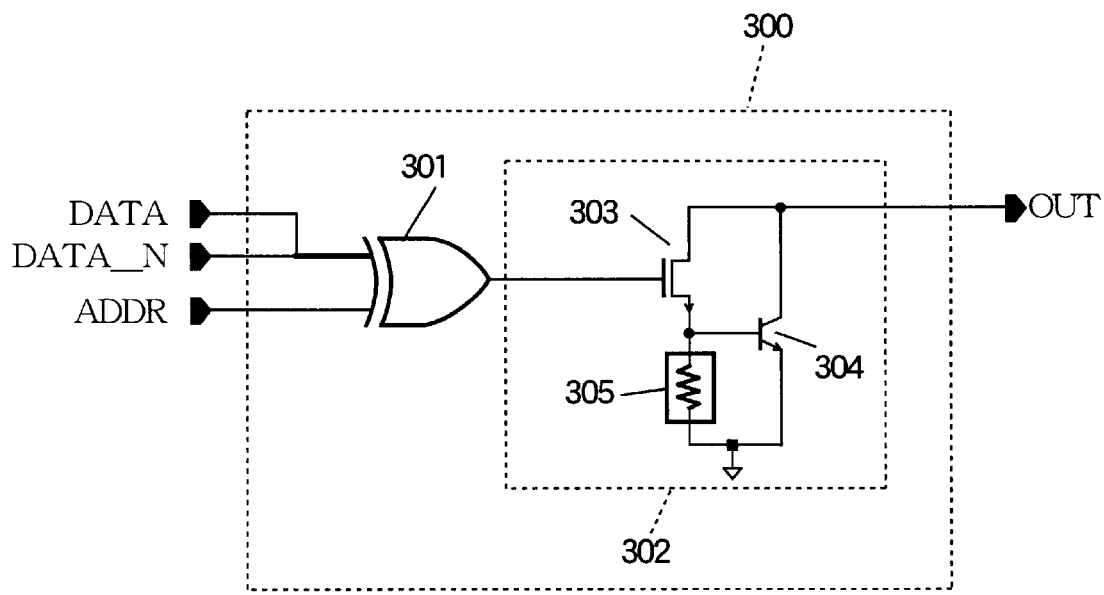
FIG. 11 illustrates the circuit configuration of a single-bit comparator in the second embodiment.

Referring to FIG. 11, the discharging element 302 comprises an NMOS transistor 303, a bipolar transistor 304, and a resistive element 305. The gate electrode of NMOS transistor 303 receives the output of the exclusive OR gate 301. The drain electrode of NMOS transistor 303 is coupled to the collector electrode of bipolar transistor 304, and to the output terminal OUT. The source electrode of NMOS transistor 303 is coupled to the base electrode of bipolar transistor 304, and to one terminal of the resistive element 305. The emitter electrode of bipolar transistor 304 and the other terminal of the resistive element 305 receive the ground potential.

Figure 12:
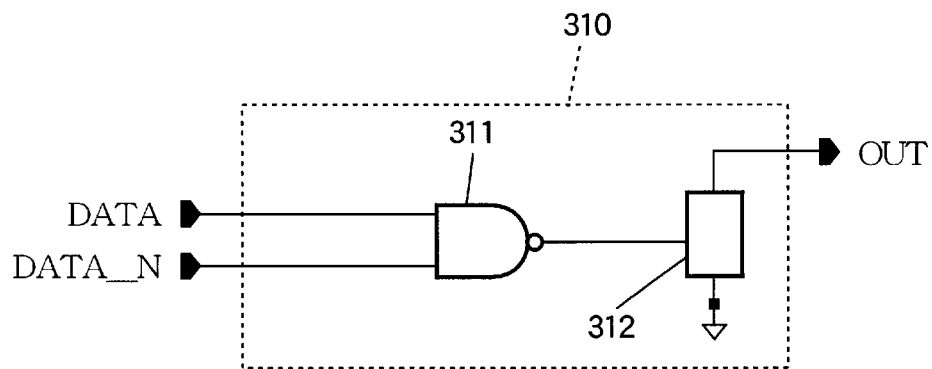
FIG. 12 illustrates the logical structure of the output control unit in the second embodiment.

Referring to FIG. 12, the output control circuit 310 has the same logical structure as in the first embodiment, comprising a NAND gate 311 and a discharging element 312. The NAND gate 311 is identical to the NAND gate 111 in the first embodiment, having the circuit configuration shown in FIG. 5.

Figure 13:
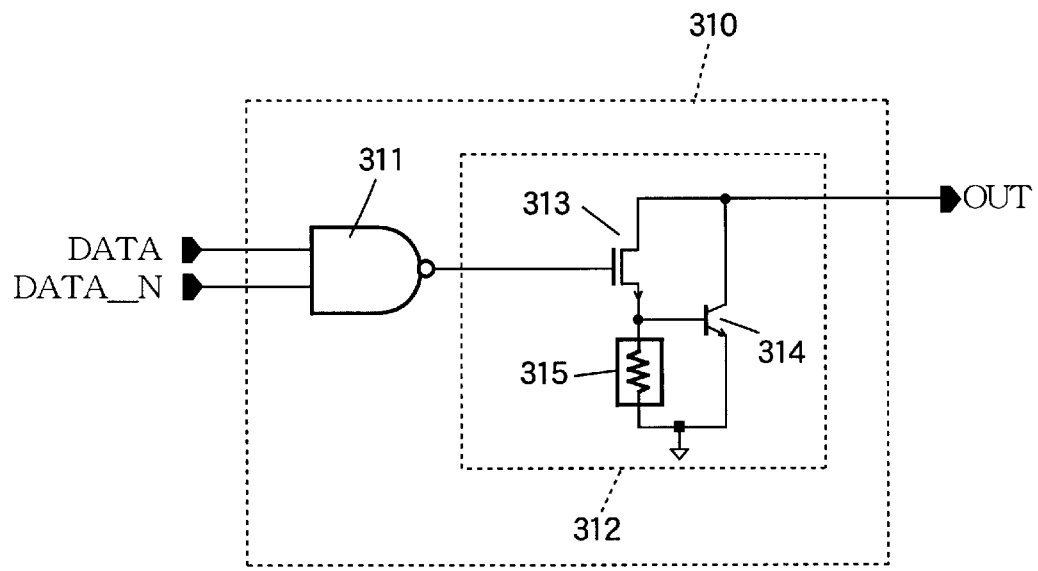
FIG. 13 illustrates the circuit configuration of the output control unit in the second embodiment.

Referring to FIG. 13, the discharging element 312 comprises an NMOS transistor 313, a bipolar transistor 314, and a resistive element 315. The gate electrode of NMOS transistor 313 receives the output of the NAND gate 311. The drain electrode of NMOS transistor 313 is coupled to the collector electrode of bipolar transistor 314, and to the output terminal OUT. The source electrode of NMOS transistor 313 is coupled to the base electrode of bipolar transistor 314, and to one terminal of the resistive element 315. The emitter electrode of bipolar transistor 314 and the other terminal of the resistive element 315 receive the ground potential.

The single-bit comparators 300 and output control circuit 310 accordingly both have an open-collector output structure. The bipolar transistors 304 and 314 have a greater current-driving capability than the NMOS transistors 303 and 313, and a greater current-driving capability than the NMOS transistors 10C and 117 in the first embodiment.

The resistive elements 302 and 312 are, for example, NMOS or PMOS transistors that are held in the on-state and have suitable on-resistance values.

Next, the operation of the n-bit comparator 20 in the second embodiment will be described.

The overall circuit operation of the n-bit comparator 20 is similar to the operation of the n-bit comparator 10 in the first embodiment for both the cache hit and cache miss cases. The following description will focus on the operation of the single-bit comparators 300 and output control circuit 310 shown in FIGS. 11 and 13.

When the clock signal CLK is at the low level, the outputs of the exclusive OR gate 301 in FIG. 11 and the NAND gate 311 in FIG. 13 are both at the low logic level, so NMOS transistors 303 and 313 are both turned off. The source electrodes of NMOS transistors 303 and 313 and the base electrodes of bipolar transistors 304 and 314 are pulled down to the ground level through the resistive elements 305 and 315, so bipolar transistors 304 and 314 are also turned off. The COMP and READY nodes are therefore disconnected from the ground potential, enabling both nodes to be pre-charged to the high logic level.

When the clock signal CLK goes high and the input signals DATA<1:n> and DATA_N<1:n> become complementary, the output of the NAND gate 311 in FIG. 13 goes high, turning on NMOS transistor 313. Some of the charge stored in the READY node now flows through NMOS transistor 313 to the base of bipolar transistor 314, causing bipolar transistor 314 to turn on. The READY node discharges quickly through bipolar transistor 314. When the READY node approaches the ground level, bipolar transistor 314 turns off, but the READY node continues to be pulled down to the ground level through the NMOS transistor 313 and resistive element 315. The resistive element 315 also pulls the base electrode of bipolar transistor 314 down to the ground level, removing the remaining base charge.

If ADDR<1:n> matches DATA<1:n> in every bit, then in every single-bit comparator 300, the output of the exclusive OR gate 301 in FIG. 11 remains low, NMOS transistor 303 remains in the off-state, bipolar transistor 304 also remains in the off-state, and the COMP node remains at the high level, permitting the HIT output signal to go high as in the first embodiment. If ADDR<1:n> and DATA<1:n> do not match, however, then in at least one single-bit comparator 300, the output of exclusive OR gate 301 goes high, NMOS transistor 303 turns on, bipolar transistor 304 turns on, the COMP node discharges quickly through bipolar transistor 304, and the HIT output signal is held at the low level.

For a given number of input bits (value of n), the second embodiment can operate at even higher speeds than the first embodiment, because the greater current-driving capability of the bipolar transistors 304 and 314 enables the COMP and READY nodes to discharge faster than in the first embodiment. Similarly, for a given operating speed, the second embodiment permits a larger number of input bits, because the bipolar transistors 304 can more quickly discharge the additional parasitic capacitance of the COMP node that results from the increased number of single-bit comparators 300.

Next, a third embodiment will be described.

Figure 14:
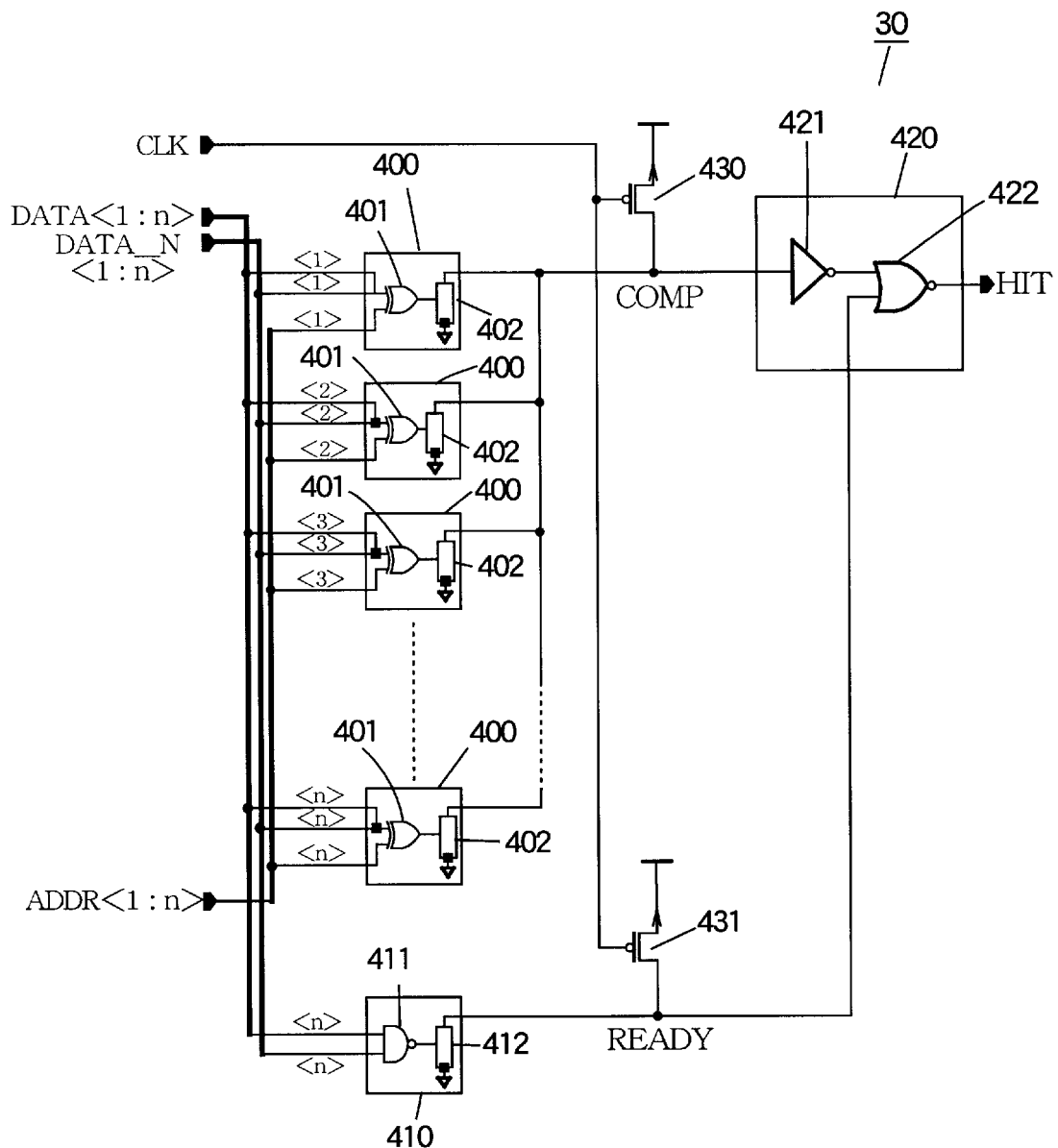
FIG. 14 is a schematic diagram of a multiple-bit comparator according to a third embodiment of the invention.

Referring to FIG. 14, the third embodiment is an n-bit comparator 30 comprising n single-bit comparators 400, an output control circuit 410, an output circuit 420, and PMOS transistors 430 and 431. The structure of this n-bit comparator 40 is identical to the structure of the n-bit comparator 10 of the first embodiment, except for the internal structure of the output control circuit 410. The output control circuit 410 is now similar in design to the single-bit comparators 400.

Figure 15:
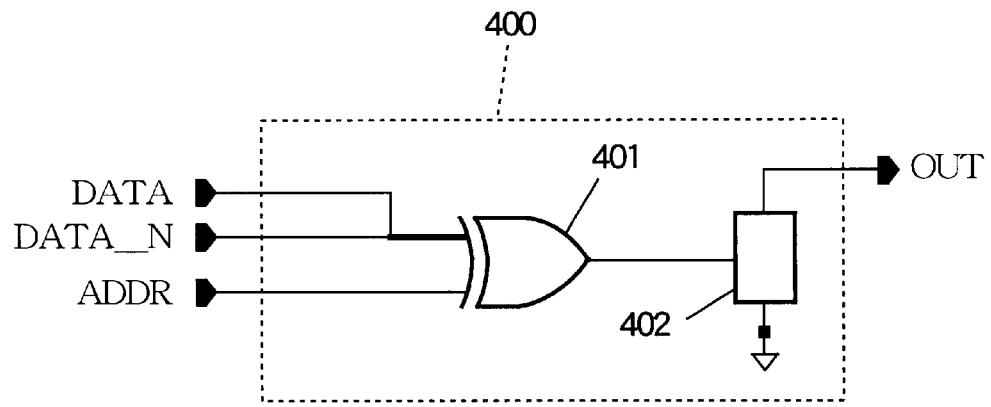
FIG. 15 illustrates the logical structure of a single-bit comparator in the third embodiment.
Figure 16:
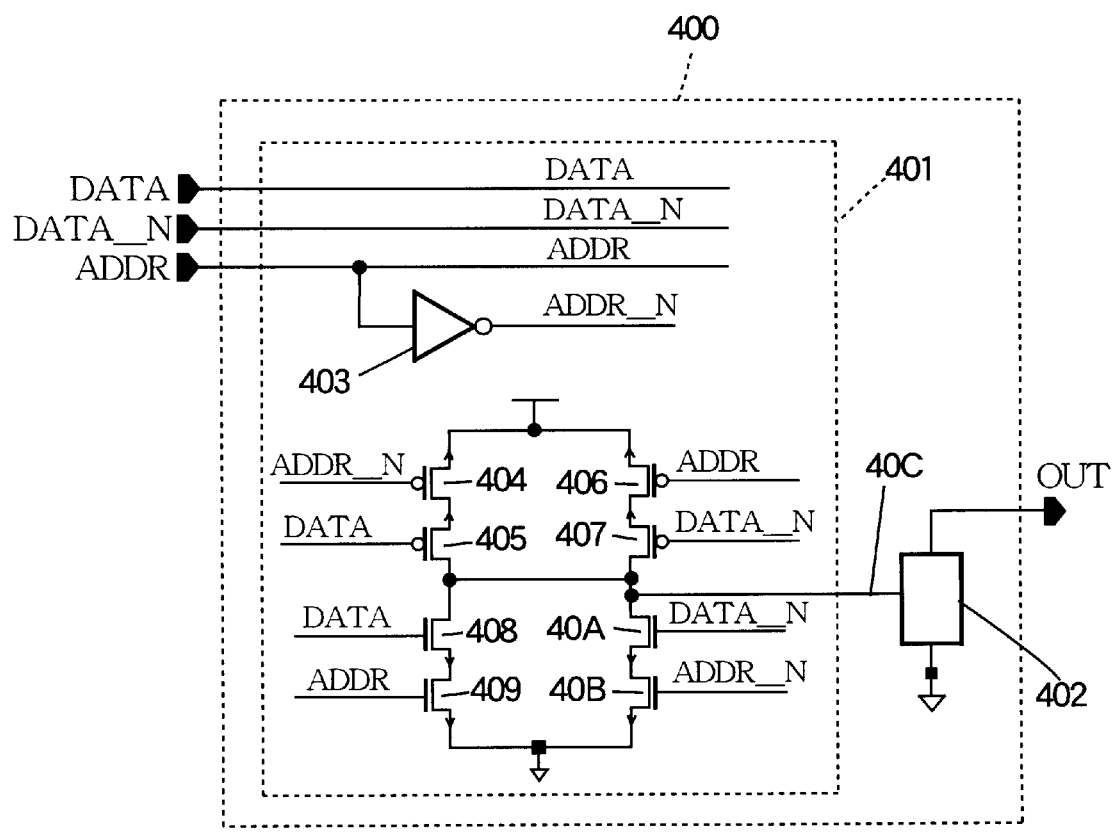
FIG. 16 illustrates the circuit configuration of a single-bit comparator in the third embodiment.

FIG. 15 shows the logical structure of the single-bit comparators 400, each of which comprises an exclusive OR gate 401 and discharging element 402. FIG. 16 shows the circuit configuration of the exclusive OR gate 401, which is identical to the exclusive OR gate 101 in the first embodiment, shown in FIG. 3. The discharging element 402 is also identical to the discharging element 102 in the first embodiment.

Figure 17:
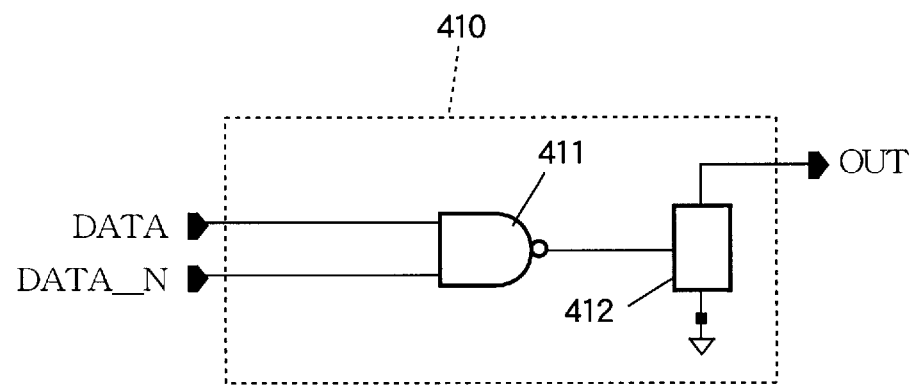
FIG. 17 illustrates the logical structure of the output control unit in the third embodiment.

Referring to FIG. 17, the output control circuit 410 has the same logical structure as in the first embodiment, comprising a NAND gate 411 coupled to the DATA and DATA_N input terminals, and a discharging element 412 that receives the output of the NAND gate 411 and drives the output terminal OUT. The discharging element 412 is identical to the discharging element 112 in the first embodiment, shown in FIGS. 4 and 5.

Figure 18:
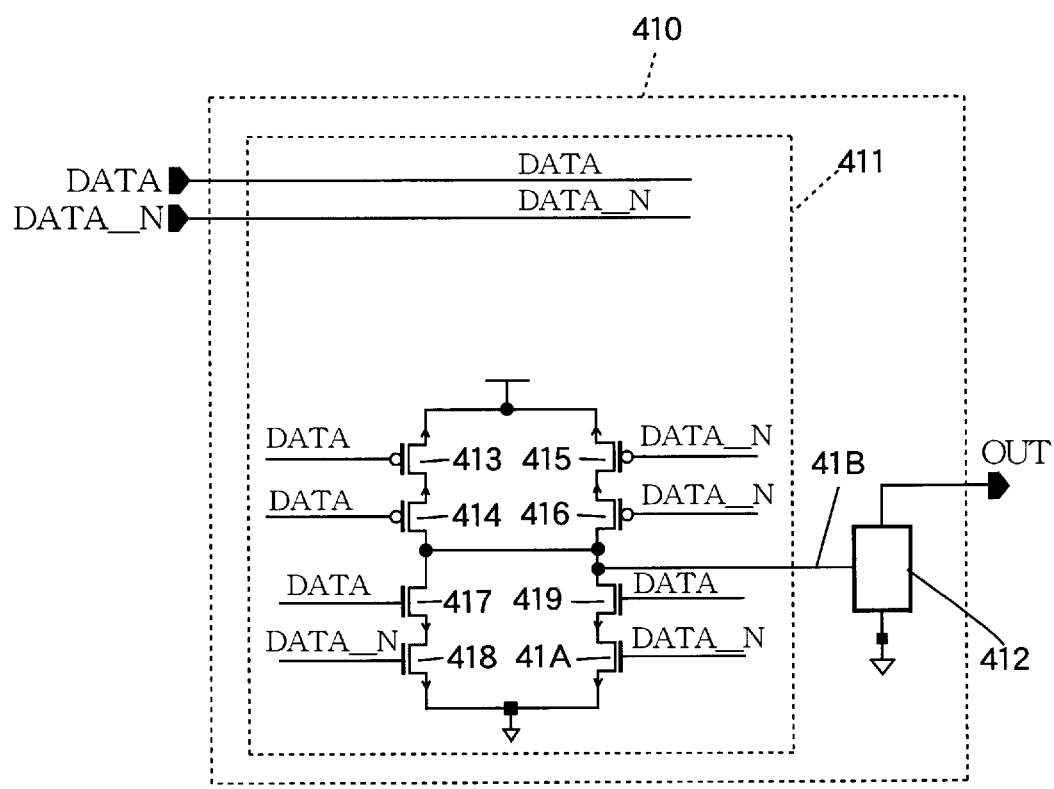
FIG. 18 illustrates the circuit configuration of the output control unit in the third embodiment.

Referring to FIG. 18, the NAND gate 411 in the output control circuit 410 comprises PMOS transistors 413, 414, 415, 416 and NMOS transistors 417, 418, 419, and 41A, which are interconnected in the same way as the PMOS transistors 404, 405, 406, 407 and NMOS transistors 408, 409, 40A, and 40B in the exclusive OR gates 401 in the single-bit comparators 300, shown in FIG. 16. The same layout of circuit elements is used in both the NAND gate 411 and exclusive OR gates 401, comprising two pairs of PMOS transistors and two pairs of NMOS transistors, each pair of transistors coupled in series to a common output terminal, the two pairs of PMOS transistors being coupled in parallel with one another between the output terminal and the power supply, and the two pairs of NMOS transistors being coupled in parallel with one another between the output terminal and ground. In FIG. 16, the output terminal is the drain terminal 40C of transistors 405, 407, 408, and 40A. In FIG. 18, the output terminal is the drain terminal 41B of transistors 414, 416, 417, and 419.

The DATA input terminal of the NAND gate 411 is coupled to the gate electrodes of PMOS transistors 413 and 414 and NMOS transistors 417 and 419. The DATA_N input terminal is coupled to the gate electrodes of PMOS transistors 415 and 416 and NMOS transistors 418 and 41A. These input connections differ from the input connections of the exclusive OR gates 401. It can be readily verified that the circuit configuration of the NAND gate 411 in FIG. 18 performs the logical NAND operation, supplying to the discharging element 412 a signal that is low when both inputs DATA and DATA_N are high, and is high when either DATA or DATA_N is low.

Next, the operation of the n-bit comparator 30 in the third embodiment will be described.

The overall circuit operation of the n-bit comparator 30 is similar to the operation of the n-bit comparator 10 in the first embodiment for both the cache hit and cache miss cases. The following description will focus on the operation of the output control circuit 410 shown in FIGS. 17 and 18.

When the clock signal CLK is low and the DATA and DATA_N inputs to the output control circuit 410 are both high, the paths through NMOS transistors 417, 418, 419, and 41A both conduct, while the paths through PMOS transistors 413, 414, 415, and 416 are in the non-conducting state, so the output of the NAND gate 411 is low and the discharging element 412 is disabled, permitting the READY node to be pre-charged to the high logic level.

When the clock signal CLK goes high and DATA<1:n> and DATA_N<1:n> become valid, one of the two inputs to the output control circuit 410, either DATA or DATA_N, goes low. As a result, either the path through PMOS transistors 413 and 414 conducts or the path through PMOS transistors 415 and 416 conducts, while the paths through NMOS transistors 417, 418, 419, and 41A are both in the non-conducting state. The output of the NAND gate 411 therefore goes high, turning on the discharging element 412, and the READY node discharges to the ground level.

A feature of the third embodiment is that the propagation delay of the DATA and DATA_N signals in the NAND gate 411 is equal to the propagation delay in the exclusive OR gates 401 in the single-bit comparators 400, because both have the same circuit configuration. In a cache miss, the discharging elements 402 in the single-bit comparators 400 of the mis-matching bits therefore turn on at the same time as the discharging element 412 in the output control circuit 410. Timing differences between the two inputs to the NOR gate 422 in the output circuit 420 are thereby reduced, and the timing design of the n-bit comparator 30 as a whole is simplified.

The circuit design process is also simplified, because the same layout can be employed in both the single-bit comparators 400 and output control circuit 410. Moreover, the process of design verification through computer simulation is simplified, because the single-bit comparators 400 and output control circuit 410 have the same parasitic capacitances and resistances and other parameters. Design turn-around time can therefore be shortened.

The propagation delay of the ADDR signal in the inverter 403 in FIG. 16 can be ignored, because ADDR<1:n> becomes valid before DATA<1:N> and DATA_N<1:n>.

As a variation of the third embodiment, the discharging elements 402 and 412 in the single-bit comparators 400 and output control circuit 410 can be given the same structure as in the second embodiment, using bipolar transistors to achieve higher-speed operation or handle a larger number of bits.

Figure 19:
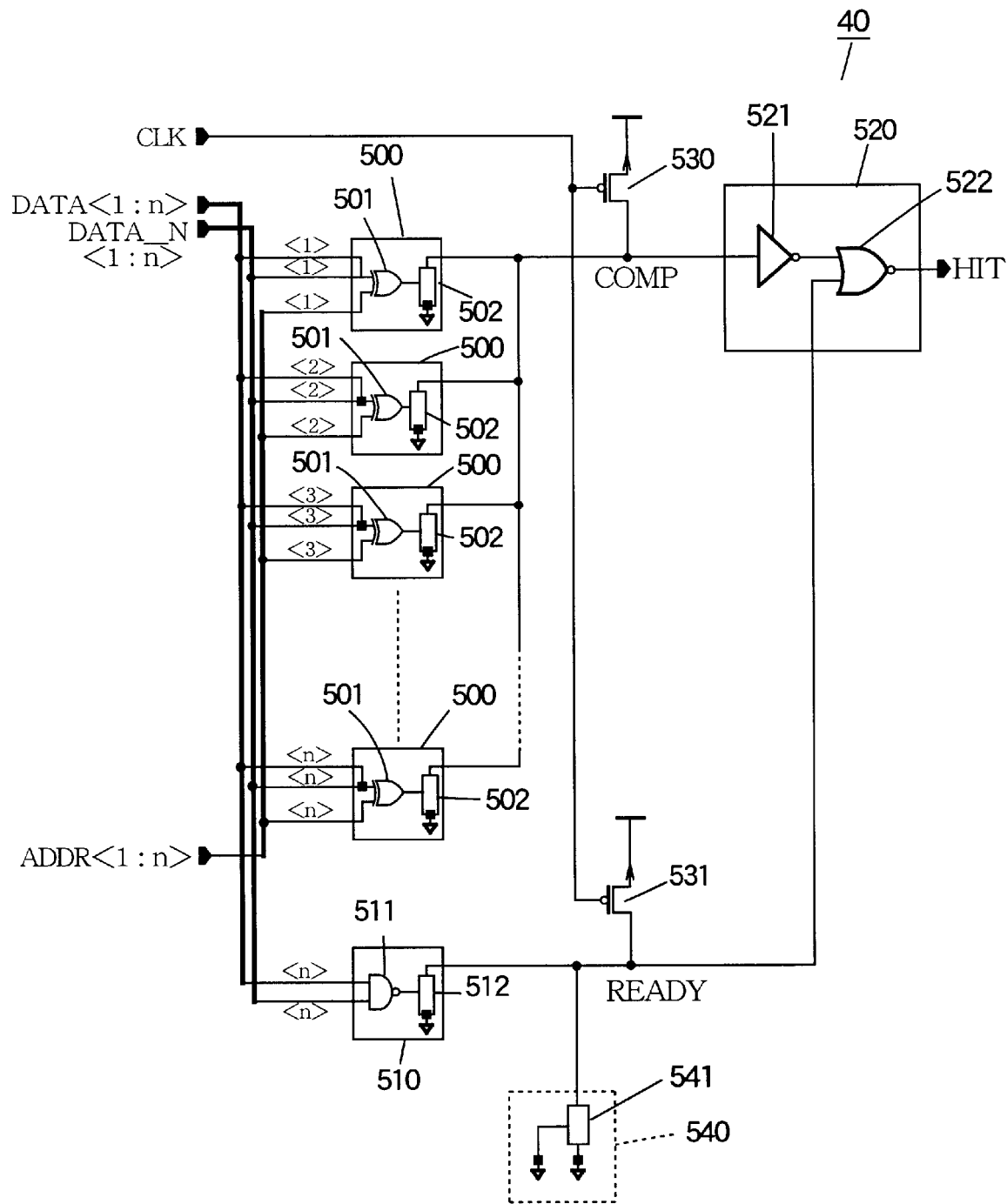
FIG. 19 is a schematic diagram of a multiple-bit comparator according to a fourth embodiment of the invention.

Next, a fourth embodiment will be described. Referring to FIG. 19, the fourth embodiment is an n-bit comparator 40 comprising n single-bit comparators 500, an output control circuit 510, an output circuit 520, PMOS transistors 530 and 531, and a capacitive dummy load 540. The fourth embodiment thus adds a dummy load 540 to the structure of the first embodiment. The other circuit elements in the fourth embodiment are identical to the corresponding elements in the first embodiment.

The dummy load 540 is coupled to the READY node. The function of the dummy load 540 is to make the discharge time of the READY node equal to or greater than the discharge time of the COMP node, in the worst case in which there is only one non-matching bit and the COMP node discharges through just one single-bit comparator 500. The dummy load 540 comprises, for example, an NMOS transistor 541 having grounded gate and source electrodes, the drain electrode being coupled to the READY node. Since its gate electrode is grounded, NMOS transistor 541 is permanently turned off.

Assuming for the moment that the discharging element 512 in the output control circuit 510 has the same current-driving capability as each of the discharging elements 502 in the single-bit comparators 500, the dimensions of the NMOS transistor 541 in the dummy load 540 should be adjusted so that the total parasitic capacitance of the READY node is equal to or greater than the total parasitic capacitance of the COMP node. The parasitic capacitance of the READY node includes both the parasitic capacitance of the interconnecting lines coupled to the READY node, and the parasitic junction capacitance in the coupled transistor or transistors in the discharging element 512 in the output control circuit 510. The parasitic capacitance of the COMP node includes the parasitic capacitance of the interconnecting lines coupling the COMP node to all n single-bit comparators 500, and the sum of the parasitic junction capacitances of transistors in the n discharging elements 502.

Next, the operation of the n-bit comparator 40 in the fourth embodiment will be described.

The overall circuit operation of the n-bit comparator 40 is similar to the operation of the n-bit comparator 10 in the first embodiment for both the cache hit and cache miss cases, but the fourth embodiment provides superior protection against hazards in the HIT output signal when a cache miss occurs.

Figure 20:
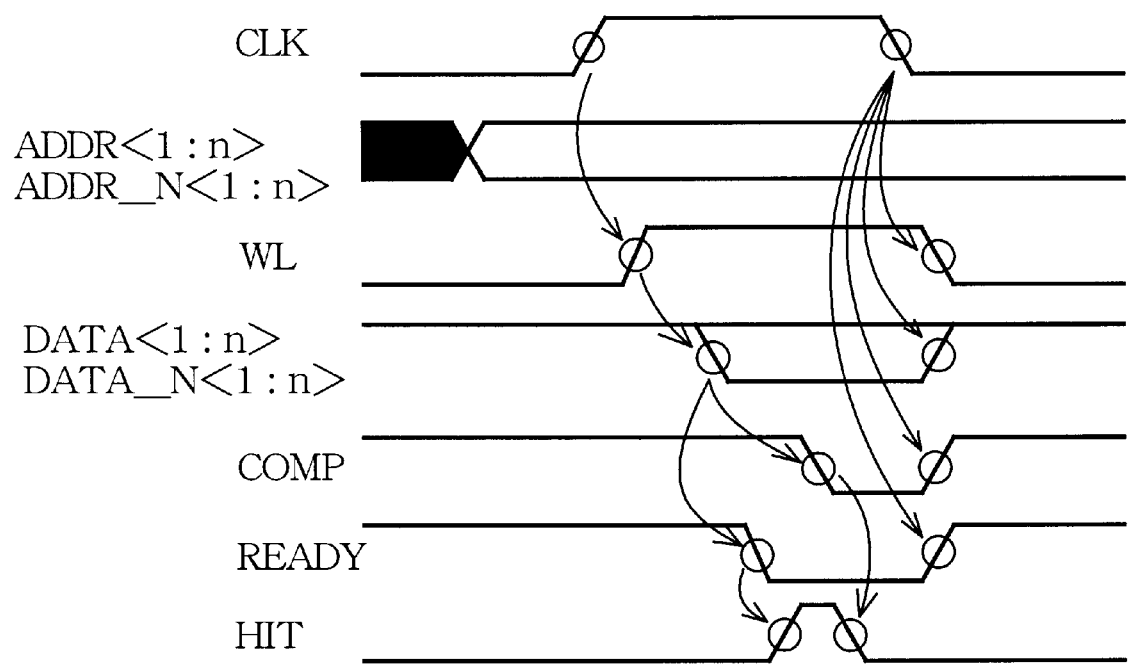
FIG. 20 is a waveform diagram illustrating a hazard.

FIG. 20 shows how such a hazard might occur in a cache miss in the first embodiment. The clock signal CLK goes high, the word line WL goes high, the input signals DATA<1:n> and DATA_N<1:n> go to complementary states, and the READY node goes low with the same timing as shown in FIG. 8. If the COMP node takes significantly longer than the READY node to discharge, there will be a delay before the COMP node goes low. During the interval between the fall of the READY potential and the fall of the COMP potential, the NOR gate 522 receives two low inputs, and the HIT output signal goes high, as shown, incorrectly indicating a cache hit.

The length of the delay from the fall of the READY potential to the fall of the COMP potential is exaggerated in FIG. 20 for the sake of clarity; hazards of the magnitude depicted in FIG. 20 normally do not occur in the first embodiment, even if the cache miss is a mis-match in only a single bit. However, the appearance of spike-like hazards in the HIT signal cannot be completely ruled out.

In the fourth embodiment, when a single bit mismatches, the READY node does not discharge before the COMP node, because it has equal or greater parasitic capacitance. Hazards of the type shown in FIG. 20 accordingly do not occur.

When two or more bits mis-match, the COMP node discharges faster than the READY node, because the COMP node discharges through two or more discharging elements 502 while the READY node discharges through only a single discharging element 512. In this case there is an interval in which the NOR gate 522 receives two high inputs instead of just one, but that does not create a hazard, as the output of the NOR gate 522 remains low.

If the current-driving capability of the discharging element 512 in the output control circuit 510 is not equal to the current-driving capability of the discharging elements 502 in the single-bit comparators 500, the capacitance of the dummy load 540 should be adjusted accordingly, to make the discharge time of the READY node equal to or greater than the worst-case discharge time of the COMP node.

Next, a fifth embodiment will be described.

Figure 21:
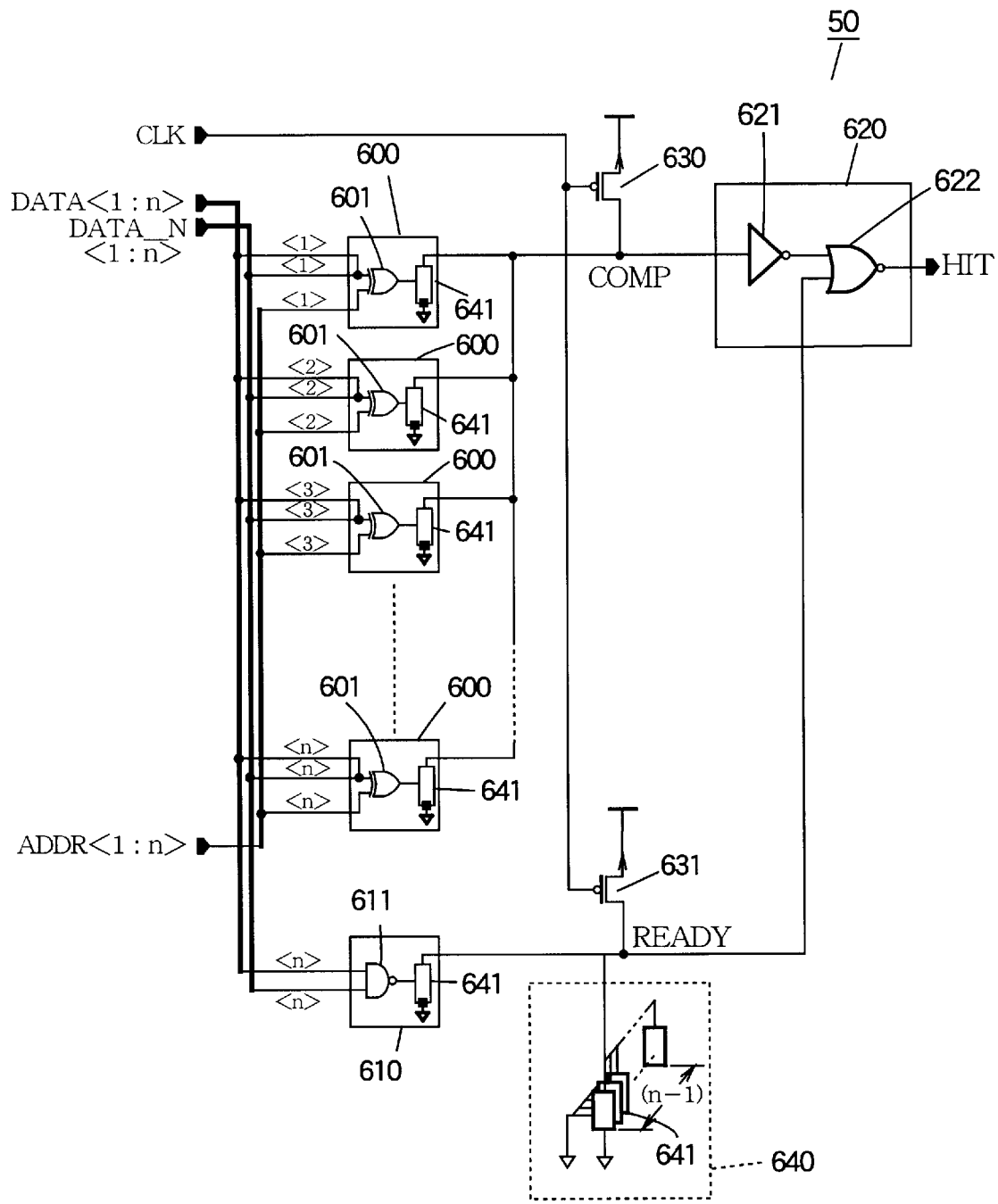
FIG. 21 is a schematic diagram of a multiple-bit comparator according to a fifth embodiment of the invention.

Referring to FIG. 21, the fifth embodiment is an n-bit comparator 50 comprising n single-bit comparators 600, an output control circuit 610, an output circuit 620, PMOS transistors 630 and 631, and a dummy load 640. Except for the dummy load 640, these elements are similar to the corresponding elements in the fourth embodiment.

The fourth embodiment allowed the single-bit comparators and output control circuit to use discharging elements with different current-driving capabilities. The fifth embodiment, however, employs identical discharging elements 641, with equal current-driving capabilities, in both the single-bit comparators 600 and the output control circuit 610. The dummy load 640 comprises n−1 more of these identical discharging elements 641 coupled in parallel to the READY terminal.

The structure of the discharging elements 641 in the single-bit comparators 600, output control circuit 610, and dummy load 640 may be that shown in the first embodiment, comprising a single NMOS transistor. Alternatively, the discharging elements 641 may all have the structure shown in the second embodiment, each comprising an NMOS transistor, a bipolar transistor, and a resistive element, or any other suitable structure.

The discharging elements 641 in the dummy load 640 are permanently turned off, e.g. by grounding the gate electrodes of their constituent NMOS transistors, so they do not pull down the potential of the READY terminal. The only function of the discharging elements 641 in the dummy load 640 is to provide additional parasitic junction capacitance for the READY node. The COMP node is coupled to n discharging elements 641 in the n single-bit comparators 600. The READY node is likewise coupled to n discharging elements 641 (one in the output control circuit 610 and n−1 in the dummy load 640), so the parasitic junction capacitances of the COMP and READ nodes are exactly equal.

The n-bit comparator 50 of the fifth embodiment operates in the same way as the n-bit comparator 40 of the fourth embodiment. In a cache miss, in the worst case in which only one bit mis-matches, the COMP and READY nodes discharge in substantially equal times, because both nodes are coupled to identical parasitic junction capacitances, and both nodes discharge through identical discharging elements 641. If more than one bit mis-matches, the COMP node discharges more rapidly than the READY node. In either case, no hazards appear in the HIT output signal.

The advantage of the fifth embodiment is that the use of structurally identical discharging elements 641 assures equal junction capacitances and equal current-driving capabilities, without the need to rely on calculated values for these parameters. The circuit design process is therefore simplified, and timing reliability is improved. In particular, fabrication process variations that alter the characteristics of the discharging elements do not upset the circuit timing relationships.

Next, a sixth embodiment will be described.

Figure 22:
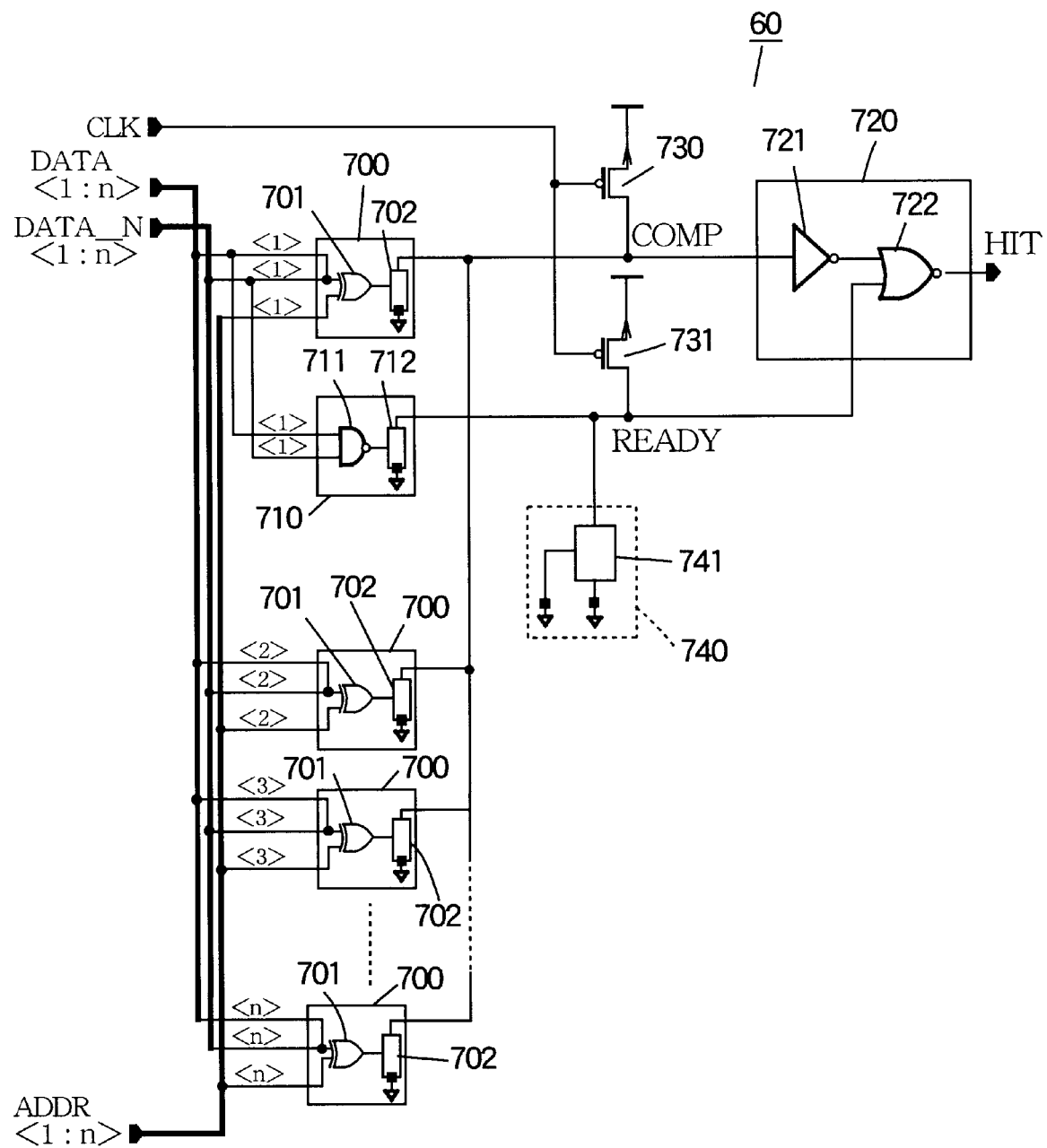
FIG. 22 is a schematic diagram of a multiple-bit comparator according to a sixth embodiment of the invention.

Referring to FIG. 22, the n-bit comparator 60 of the sixth embodiment comprises n single-bit comparators 700, an output control circuit 710, an output circuit 720, PMOS transistors 730 and 731, and a dummy load 740. These elements are identical to the corresponding elements in the fourth embodiment. The difference between the n-bit comparator 40 of the fourth embodiment and the n-bit comparator 60 of the sixth embodiment concerns the physical layout and input connections of the circuit elements, specifically, the disposition and input connections of the output control circuit 710.

In the sixth embodiment, the input signal lines to the output control circuit 710 are branched from the input signal lines of one of the single-bit comparators 700. This single-bit comparator 700 is the single-bit comparator 700 which is disposed farthest from the output circuit 720 in terms of interconnecting signal-line length.

The output control circuit 710 is placed physically adjacent to this single-bit comparator 700, so that both branches of the input signal lines have substantially the same length and substantially equal parasitic resistance and capacitance. Similarly, the length of the signal line interconnecting this farthest single-bit comparator 700 to the output circuit 720, passing through the COMP node, is substantially equal to the length of the signal line interconnecting the output control circuit 710 to the output circuit 720, passing through the READY node, and both signal lines have substantially equal parasitic resistances and capacitances.

If, for example, the single-bit comparator 700 that receives the first bits DATA<1>, DATA_N<1>, and ADDR<1> of the input signals is separated from the output circuit 720 by the greatest length of interconnecting signal line, then the first-bit input signal lines are branched to bring DATA<1> and DATA_N<1> to both this farthest single-bit comparator 700 and the output control circuit 710, as shown in FIG. 22. It may appear that the single-bit comparator 700 receiving input signals DATA<1>, DATA_N<1>, and ADDR<1> is closest to the output circuit 720, rather than farthest away, but FIG. 22 is a schematic diagram, and does not depict the actual physical layout relationships of the circuit elements.

Next, the operation of the sixth embodiment will be described, under the assumption that the output control circuit 710 receives the DATA<1> and DATA_N<1> signals, as shown in FIG. 22.

The overall circuit operation of the n-bit comparator 60 in the sixth embodiment is similar to the operation of the n-bit comparator 40 in the fourth embodiment for both the cache hit and cache miss cases.

In a cache miss, if the only mis-matching bit is the first bit (DATA<1>≠ADDR<1>), the discharging element 702 in the single-bit comparator 700 that receives this bit and the discharging element 712 in the output control circuit 710 turn on at the substantially same time, because the input signals DATA<1> and DATA_N<1> arrive at both this single-bit comparator 700 and the output control circuit 710 at the same time. Since the dummy load 740 makes the discharge time of the READY node equal to or greater than the discharge time of the COMP node, the input to the output circuit 720 from the READY node does not change before the input from the COMP node, producing a hazard-free HIT output signal.

If there Is a mis-matching bit other than the first bit, since the single-bit comparator 700 that receives this other bit is closer than the output control circuit 710 to the output circuit 720, the output circuit 720 receives a low input from the COMP node before receiving a low input from the READY node, assuring that the HIT output signal stays low and again avoiding hazards.

By placing the output control circuit 710 adjacent to the farthest single-bit comparator 700 from the output circuit 720, in terms of interconnecting line length, and feeding identical input signals to both the output control circuit 710 and this single-bit comparator 700, the sixth embodiment helps to ensure that the READY input to the output circuit 720 does not fall before the COMP input, no matter how many input bits there are, and no matter how far the farthest single-bit comparator 700 is from the output circuit 720.

Next, a seventh embodiment will be described.

Figure 23:
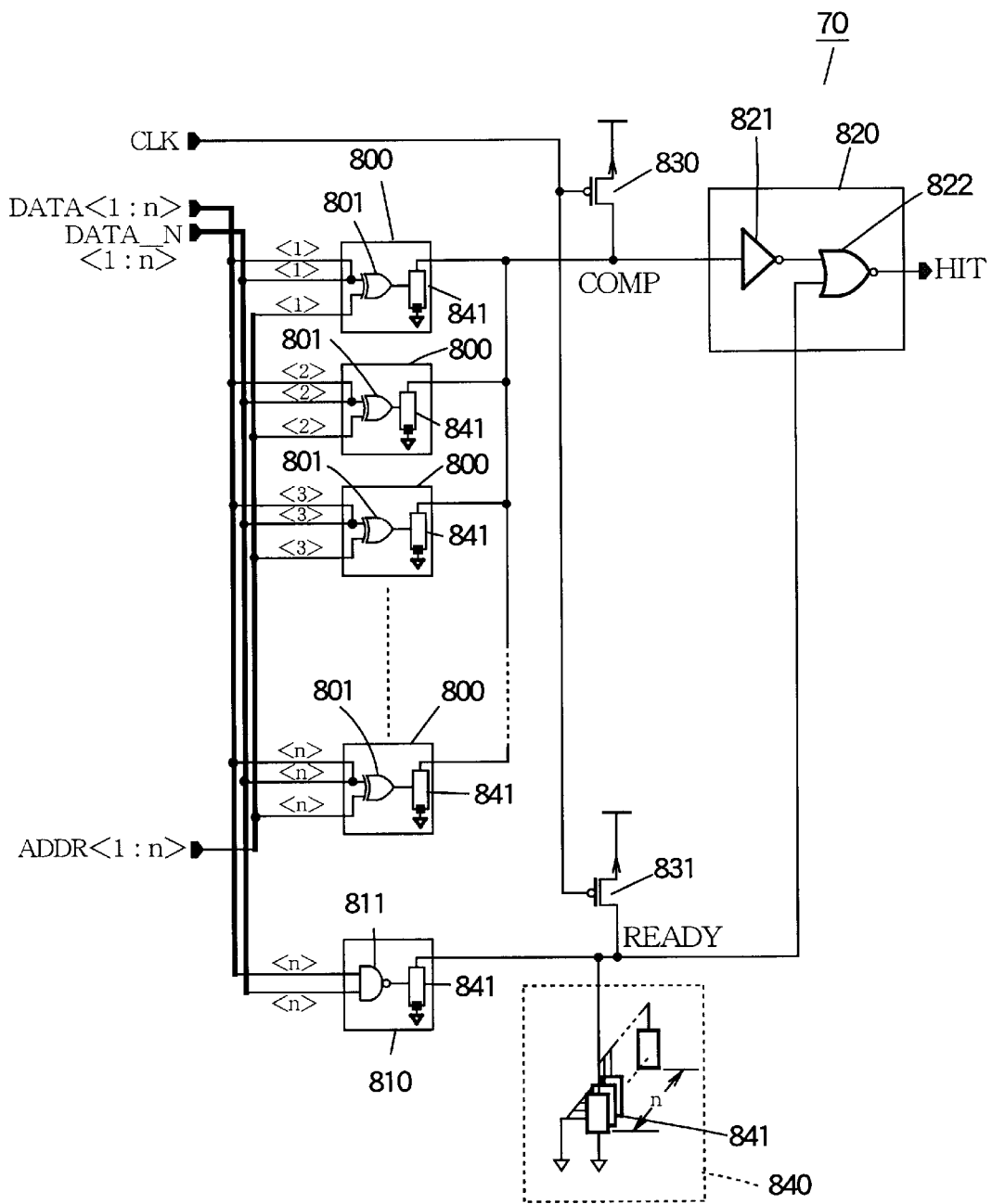
FIG. 23 is a schematic diagram of a multiple-bit comparator according to a seventh embodiment of the invention.

Referring to FIG. 23, the seventh embodiment is an n-bit comparator 70 comprising n single-bit comparators 800, an output control circuit 810, an output circuit 820, PMOS transistors 830 and 831, and a dummy load 840. The seventh embodiment is identical to the fifth embodiment, except for the internal structure of the dummy load 840.

Like the n-bit comparator 50 of the fifth embodiment, the n-bit comparator 70 of the seventh embodiment uses identical discharging elements 841 in the single-bit comparators 800, the output control circuit 810, and the dummy load 840. Differing from the fifth embodiment, the seventh embodiment places at least n of these discharging elements 841 in the dummy load 840, making the parasitic junction capacitance of the READY node greater than the parasitic junction capacitance of the COMP node.

The overall circuit operation of the n-bit comparator 70 of the seventh embodiment is similar to the operation of the fifth embodiment for both the cache hit and cache miss cases, except that when a cache miss occurs, even if only one bit mis-matches, the potential of the READY node falls more slowly than the potential of the COMP node. This is because the parasitic junction capacitance that must be discharged at the READY node exceeds the parasitic junction capacitance that must be discharged at the COMP node.

Even in the worst case, accordingly, the READY node does not fall until after the COMP node has become ready. Extra protection against hazards in the HIT output signal is thereby provided.

Figure 24:
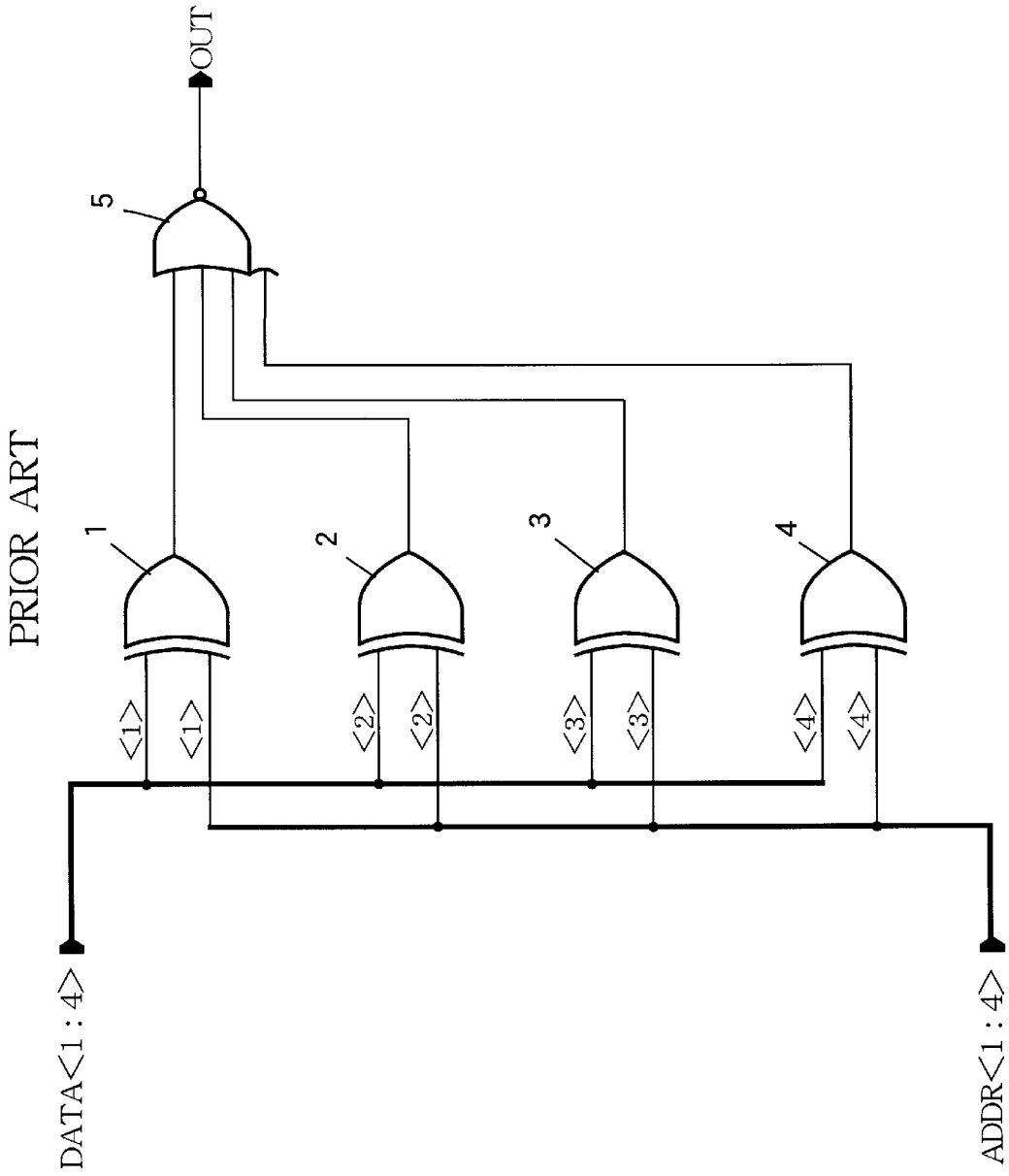
FIG. 24 is a schematic diagram of a prior-art multiple-bit comparator.

For comparison with the embodiments above, FIG. 24 shows an example of a classic n-bit comparator when n is equal to four. The individual bits of input signals DATA<1:4> and ADDR<1:4> are supplied to four exclusive OR gates 1, 2, 3, and 4, the outputs of which are combined by a four-input NOR gate 5. Aside from the problems noted earlier of designing a NOR gate with many inputs, the circuit in FIG. 24 requires a separate interconnecting line to the NOR gate 5 from each of the exclusive OR gates 1, 2, 3, and 4, which correspond to the single-bit comparators of the present invention. The present invention saves space by using a single interconnecting line for all of the single-bit comparators.

The embodiments above have been described in relation to hit-miss detection in a cache memory, but the invention is not restricted to this application. The invented multiple-bit comparator can be applied in any circuit that must compare two multiple-bit input signals A and B and generate an output signal indicating whether the two input signals are identical or not, provided the following two conditions are satisfied.

The first condition is that one of the input signals, e.g. signal B, must have valid and invalid states which can be detected from transitions in the signal itself. In the embodiments above, this condition was satisfied by having signal B input as a pair of signals DATA<1:n> and DATA_N<1:n> which were complementary when valid and identical when invalid.

The second condition is that this signal B must not change from the invalid state to the valid state until the other input signal (signal A) becomes valid.

The embodiments above can be combined in various ways, too numerous to be listed completely. For example, the features of the second, third, and fourth embodiments can be combined, or the features of the sixth and seventh embodiments can be combined.

In the output of the invented comparator, it is not necessary for the high logic level to designate a hit and the low logic level a miss; these logic levels can be reversed. Internal logic levels can also be reversed, by interchanging the roles of the power-supply and ground potentials at the COMP node or READY node, or at both nodes, for example. If the COMP and READY nodes are pre-charged to different potentials, then an inverter can be eliminated from the output circuit, although in this case ensuring equal discharge times for the COMP and READY nodes may become more difficult.

It should also be noted that the invented comparator could be described as deciding whether all bits of two input signals (ADDR<1:n> and DATA_N<1:n>) mis-match, instead of whether all bits of two input signals (ADDR<1:n> and DATA<1:n>) match.

The internal circuit configurations of the single-bit comparators, output control circuit, and output circuit are not limited to the configurations described in the embodiments above. These circuits may have other configurations, employing different numbers or types of circuit elements, and different interconnection relationships.

Those skilled in the art will recognize that further modifications are possible within the scope of the invention as claimed below.

What is claimed is:

1. A multiple-bit comparator receiving a first signal and a pair of second signals, said first signal and said pair of second signals being multiple-bit signals, said pair of second signals remaining in an invalid state, in which at least one corresponding pair of bits in said pair of second signals are at identical logic levels, until said first signal becomes valid, then changing to a valid state in which all corresponding pairs of bits in said pair of second signals are at complementary logic levels, for generating an output signal indicating whether all bits of said first signal match all bits of a particular one signal in said pair of second signals, comprising:

a plurality of single-bit comparators for comparing individual bits of said first signal with individual bits of said pair of second signals and generating respective single-bit result signals;

a first node coupled to said plurality of single-bit comparators and receiving said single-bit result signals, for combining said single-bit result signals into a combined result signal;

an output control circuit for comparing said one corresponding pair of bits in said pair of second signals, detecting transitions thereof, and outputting a ready signal indicating when said pair of second signals are valid;

a second node coupled to said output control circuit, for receiving said ready signal; and an output circuit coupled to said first node and said second node, for performing a logic operation on said combined result signal and said ready signal, thereby generating said output signal, said output signal being held in a fixed state while said ready signal indicates that said pair of second signals are invalid, and said output signal varying responsive to said combined result signal when said ready signal indicates that said pair of second signals are valid.

2. The comparator of claim 1, wherein said plurality of single-bit comparators are coupled to said first node in a wired-OR configuration.

3. The comparator of claim 2, also comprising a first precharging element for precharging said first node to a first logic level while said pair of second signals are invalid.

4. The comparator of claim 3, wherein each of said single-bit comparators separately comprises a first discharging element for discharging said first node from said first logic level to a second logic level responsive to said first signal and said pair of second signals, when said pair of second signals are valid.

5. The comparator of claim 4, wherein said first discharging element comprises a field-effect transistor having a drain electrode coupled to said first node, giving said single-bit comparators an open-drain output structure.

6. The comparator of claim 4, wherein said first discharging element comprises a bipolar transistor having a collector electrode coupled to said first node, giving said single-bit comparators an open-collector output structure.

7. The comparator of claim 4, also comprising a second pre-charging element for precharging said second node to a third logic level while said pair of second signals are invalid.

8. The comparator of claim 7, wherein said first logic level and said third logic level are identical.

9. The comparator of claim 7, wherein said first logic level and said third logic level are different.

10. The comparator of claim 7, wherein said output control circuit comprises a second discharging element for discharging said second node from said third logic level to a fourth logic level when said pair of second signals are valid.

11. The comparator of claim 10, wherein said second discharging element comprises a field-effect transistor having a drain electrode coupled to said second node, giving said output control circuit an open-drain output structure.

12. The comparator of claim 10, wherein said second discharging element comprises a bipolar transistor having a collector electrode coupled to said second node, giving said output control circuit an open-collector output structure.

13. The comparator of claim 10, wherein each of said single-bit comparators separately has a first logic gate receiving one bit of said first signal and one corresponding pair of bits of said pair of second signals, for controlling said first discharging element.

14. The comparator of claim 13, wherein said output control circuit has a second logic gate receiving said one corresponding pair of bits in said pair of second signals, for controlling said second discharging element.

15. The comparator of claim 14, wherein said second logic gate and said first logic gates comprise identical circuit layouts with different input signals.

16. The comparator of claim 15, wherein said second logic gate and said first logic gates each separately comprise:
   an output terminal;
   a first pair of p-channel field-effect transistors coupled in series to said output terminal;
   a second pair of p-channel field-effect transistors coupled in series to said output terminal, in parallel with said first pair of p-channel field-effect transistors;
   a first pair of n-channel field-effect transistors coupled in series to said output terminal; and
   a second pair of n-channel field-effect transistors coupled in series to said output terminal, in parallel with said first pair of n-channel field-effect transistors.

17. The comparator of claim 1, also comprising a dummy load coupled to said second node, providing said ready signal with a signal delay not less than a signal delay of said combined result signal when said first signal fails to match said particular one signal in said pair of second signals in just one bit.

18. The comparator of claim 10, wherein the first discharging elements in said single-bit comparators are structurally identical to the second discharging element in said output control circuit, also comprising:
   a dummy load coupled to said second node, said dummy load having a number of third discharging elements that are also structurally identical to said second discharging element, said third discharging elements being permanently turned off and not discharging said second node.

19. The comparator of claim 18, wherein the number of said third discharging elements is one less than a number of bits in said first signal.

20. The comparator of claim 18, wherein the number of said third discharging elements is not less than a number of bits in said first signal.

21. The comparator of claim 1, wherein said output control circuit is disposed adjacent a farthest one of said single-bit comparators from said output circuit, in terms of interconnecting signal-line length, said output control circuit and said farthest one of said single-bit comparators both receiving an identical pair of corresponding bits in said pair of second signals.

22. A method of comparing a first signal with a second signal, said first signal and said second signal being multiple-bit signals, to determine whether all bits of said first signal match corresponding bits of said second signal, comprising the steps of:
   comparing individual bits of said first signal with corresponding bits of said second signal to produce individual comparison results;
   detecting, from transitions in said second signal, when said second signal is valid and when said second signal is invalid;
   holding an output signal at a fixed logic level when said second signal is invalid; and
   controlling said output signal responsive to said individual comparison results when said second signal becomes valid.

23. The method of claim 22, wherein said second signal comprises pairs of bits that have complementary values when said second signal is valid, and have identical values when said second signal is invalid, and said step of detecting comprises performing a logic operation on one pair of bits in said second signal.

24. The method of claim 22, wherein said fixed logic level is a logic level indicating that said first signal does not match said second signal.

25. The method of claim 22, wherein said step of controlling comprises the further steps of:
   pre-charging a first node to a first logic level while said second signal is invalid; and
   discharging said first node to a second logic level if any of said individual comparison results indicate that said first signal does not match said second signal.

26. The method of claim 25, wherein said step of holding comprises the further steps of:
   pre-charging a second node to a third logic level while said second signal is invalid; and
   discharging said second node to a fourth logic level when said second signal becomes valid, said output signal being produced by performing a logic operation on logic levels of said first node and said second node.

27. The method of claim 26, comprising the further step of coupling said second node to a capacitive dummy load, thereby adjusting a discharge time of said second node.

28. The method of claim 27, wherein the discharge time of said second node is adjusted to a time equal to a discharge time of said first node when only one bit of said first signal fails to match a corresponding bit in said second signal.

29. The method of claim 27, wherein the discharge time of said second node is adjusted to a time greater than a discharge time of said first node when only one bit of said first signal fails to match a corresponding bit in said second signal.

* * * * *